US009232446B2

(12) United States Patent
Kubota

(10) Patent No.: US 9,232,446 B2
(45) Date of Patent: Jan. 5, 2016

(54) BASE STATION, MOBILE COMMUNICATION SYSTEM, AND CALL ADMISSION CONTROL METHOD AND CALL ADMISSION CONTROL PROGRAM OF BASE STATION

(75) Inventors: Mitsuhiro Kubota, Tokyo (JP); Akihiko Kubota, legal representative, Ehime (JP); Junko Kubota, legal representative, Ehime (JP)

(73) Assignee: NEC CORPORATION, Tokyo (JP)

(*) Notice: Subject to any disclaimer, the term of this patent is extended or adjusted under 35 U.S.C. 154(b) by 214 days.

(21) Appl. No.: 13/701,072
(22) PCT Filed: Feb. 23, 2011
(86) PCT No.: PCT/JP2011/001022
§ 371 (c)(1),
(2), (4) Date: Feb. 7, 2013
(87) PCT Pub. No.: WO2011/151950
PCT Pub. Date: Dec. 8, 2011

(65) Prior Publication Data
US 2013/0143566 A1 Jun. 6, 2013

(30) Foreign Application Priority Data
Jun. 1, 2010 (JP) .................. 2010-125867

(51) Int. Cl.
H04Q 7/10 (2006.01)
H04W 36/00 (2009.01)
H04W 36/30 (2009.01)
H04W 36/08 (2009.01)

(52) U.S. Cl.
CPC .......... *H04W 36/0061* (2013.01); *H04W 36/30* (2013.01); *H04W 36/08* (2013.01)

(58) Field of Classification Search
CPC ..... H04W 28/02; H04W 28/08; H04W 28/16; H04W 36/0083; H04W 36/30
USPC ......... 455/453, 436, 439, 522, 432, 438, 442, 455/443, 444; 370/395.2, 328–329, 333, 370/330, 331, 332
See application file for complete search history.

(56) References Cited

U.S. PATENT DOCUMENTS 5,640,414 A * 6/1997 Blakeney et al. ............. 375/130
5,805,995 A * 9/1998 Jiang et al. .................... 455/436
(Continued)

FOREIGN PATENT DOCUMENTS

CN 1394013 A 1/2003
CN 1909737 A 2/2007
(Continued)

OTHER PUBLICATIONS

"Radio Resource Control (RRC)", 3GPP TS 36.331 V9.1.0, Dec. 2009, p. 73.
(Continued)

*Primary Examiner* — Patrick Edouard
*Assistant Examiner* — Julio Perez
(74) *Attorney, Agent, or Firm* — Sughrue Mion, PLLC

(57) ABSTRACT

In order to reduce the occurrence of call loss in mobile stations while suppressing degradation of communication quality in a handover destination cell, a communication unit (11) forming an eNB (10) receives, from another eNB located adjacent to an own eNB, a first reception quality in a cell formed by the own eNB and a second reception quality in a cell formed by the another eNB. The first reception quality and the second reception quality are measured by one or more UE that are in radio communication with the another eNB. A control unit (12) accepts a call associated with UE which satisfies a first condition that the first reception quality is higher than the second reception quality in preference to a call associated with UE which does not satisfy the first condition. Alternatively, the control unit (12) accepts a call associated with UE which satisfies the first condition and a second condition that a difference between the first reception quality and the second reception quality is equal to or larger than a first threshold in preference to a call associated with UE which does not satisfy the first condition or the second condition.

14 Claims, 13 Drawing Sheets

(56) References Cited

U.S. PATENT DOCUMENTS

| | | | |
|---|---|---|---|
| 6,496,492 B1 | 12/2002 | Zeng | |
| 6,895,245 B2 * | 5/2005 | Wallentin | 455/436 |
| 7,016,686 B2 * | 3/2006 | Spaling et al. | 455/453 |
| 8,805,372 B2 * | 8/2014 | Cook et al. | 455/436 |
| 2011/0059741 A1 * | 3/2011 | Klein | 455/436 |

FOREIGN PATENT DOCUMENTS

| | | |
|---|---|---|
| CN | 101111076 A | 1/2008 |
| CN | 101594641 A | 12/2009 |
| JP | 2000-078639 A | 3/2000 |
| JP | 2007-174282 A | 7/2007 |
| JP | 2008-103865 A | 5/2008 |
| JP | 2009-171477 A | 7/2009 |
| WO | 2005/011319 A1 | 2/2005 |

OTHER PUBLICATIONS

Communication dated Dec. 24, 2014, issued by the State Intellectual Property Office of the People's Republic of China in counterpart Application No. 201180027468.4.

* cited by examiner

| REQUIRED BIT RATE | LOAD INCREASE AMOUNT L_d | L_d × α (WHERE α = "1.2") |
|---|---|---|
| 0 - 100kbps | 0.01 | 0.012 |
| 100 - 500kbps | 0.02 | 0.024 |
| 500 - 1000kbps | 0.1 | 0.12 |
| 1 - 1.5Mbps | 0.15 | 0.18 |
| 1.5 - 2Mbps | 0.2 | 0.24 |
| 2 - 2.5Mbps | 0.25 | 0.3 |
| 2.5Mbps - | 0.3 | 0.36 |

BASE STATION, MOBILE COMMUNICATION SYSTEM, AND CALL ADMISSION CONTROL METHOD AND CALL ADMISSION CONTROL PROGRAM OF BASE STATION

CROSS REFERENCE TO RELATED APPLICATIONS

This application is a National Stage of International Application No. PCT/JP2011/001022 filed Feb. 23, 2011, claiming priority based on Japanese Patent Application No. 2010-125867 filed Jun. 1, 2010, the contents of all of which are incorporated herein by reference in their entirety.

TECHNICAL FIELD

The present invention relates to a base station, a mobile communication system, and a call admission control method and a call admission control program of a base station, and more specifically, to a call admission technique when handover is performed between radio base stations by a mobile station.

BACKGROUND ART

The introduction of LTE (Long Term Evolution) has been considered as a next-generation mobile communication system, and is being standardized. In the LTE, it is possible to improve the communication speed compared to current third-generation mobile communication systems (e.g., W-CDMA (Wideband Code Division Multiple Access)).

Specifically, in the LTE, OFDMA (Orthogonal Frequency Division Multiple Access) is employed for a downlink radio access system, and SC (Single Carrier)-FDMA is employed for an uplink radio access system.

The OFDMA is a digital modulation system for multiplexing a plurality of carrier waves (typically referred to as subcarriers) using the orthogonality of frequencies. One of the characteristics of the OFDMA is its high tolerance against fading and multi-path interference.

In contrast, the SC-FDMA has characteristics that are similar to those of the OFDMA. The SC-FDMA is different from the OFDMA in that it continuously allocates the subcarriers to users. Thus, the SC-FDMA is expected to improve power efficiency in comparison with the OFDMA. The uplink radio resources are divided into frequency components and time components, and the divided radio resources are allocated to users.

Further, various measures to make an effective use of limited radio resources in the LTE have been examined for the purpose of improving the communication speed in the whole system. One of these measures includes a function of distributing load among cells. Roughly speaking, this function is to cause UE (User Equipment) to be handed over to a neighboring cell when there are mobile stations (UE) concentrated in one cell, to avoid a situation in which load is applied only on specific cells. Accordingly, it is expected that both of the throughput of UE that exists in the cell boundary and the throughput of the whole system are improved.

Specifically, a handover in the LTE is executed when triggered by Measurement Report from UE to a radio base station (eNB: enhanced Node B). Events A1-A5 are defined in NPTL 1 as a type of the Measurement Report. Among Events A1-A5, Event A3, which specifically triggers the handover, is transmitted from the UE when the condition shown in the following equation (1) is satisfied.

$$Mn+Ofn+Ocn-Hys>Ms+Ofs+Ocs+\text{Off} \tag{1}$$

In the left-hand side of the above equation (1), Mn denotes reception quality in a neighboring cell. The symbol Ofn is an offset regarding the frequency band used in the neighboring cell. The symbol Ocn is an offset specific to the neighboring cell. The symbol Hys is a hysteresis parameter regarding Event A3. Meanwhile, in the right-hand side of the above equation (1), Ms denotes reception quality in a serving cell. The symbol Ofs is an offset regarding the frequency band used in the serving cell. The symbol Ocs is an offset specific to the serving cell. The symbol Off is an offset parameter regarding Event A3.

As a rule, the UE transmits Event A3 to the eNB when the reception quality Mn in the neighboring cell measured by itself exceeds the reception quality Ms in the serving cell, to thereby request the handover. Note that the reception qualities Mn and Ms can be included in Event A3.

Incidentally, when the value of the offset Ocn becomes larger, it is easier to satisfy the condition shown in the above equation (1). In contrast, when the value of the offset Ocn becomes smaller, it is more difficult to satisfy the condition shown in the above equation (1). In short, by changing the offset Ocn, it is possible to make it easy to perform handover, or to make it difficult to perform handover of the UE to a specific neighboring cell.

Thus, when the cell load of the eNB is high, the eNB changes the offset Ocn, includes the change in broadcast information or a control signal to notify it to the UE, thereby causing the UE to transmit Event A3. Accordingly, the handover by the load distribution function is executed.

Further, the eNB typically uses PF (Proportional Fair) scheduling when allocating radio resources to UE. In the PF scheduling, the fairness of the throughput for each cell and the throughput among UE is considered. In other words, when there are numerous UE in the cell of the eNB, the eNB may not be able to guarantee the service quality required by each UE.

Accordingly, the eNB which is a handover destination of the UE (hereinafter sometimes referred to as a handover destination eNB) estimates the cell load of itself and determines whether the eNB is able to accept a new call (more specifically, bearer) according to the following equation (2). When the condition shown in the following equation (2) is satisfied, the handover destination eNB accepts the call. In the following description, the eNB communicated with the UE is denoted by a handover source eNB to differentiate it from the handover destination eNB.

$$L\_c+L\_d<L\_th \tag{2}$$

In the above equation (2), L_c denotes a current load amount in the handover destination eNB. Further, L_th denotes a threshold to determine whether it is possible to accept a call (hereinafter referred to as a call admission threshold). Furthermore, L_d denotes a load amount that is increased as a result of accepting the new call (hereinafter referred to as a load increase amount), and a fixed value is typically used as the load amount. The reason why the fixed value is used is that since the handover destination eNB does not have information regarding the radio status of UE, it is impossible to accurately estimate the load increase amount L_d.

As a reference technique, PTL 1 discloses a mobile communication system in that an upper node connected to a handover source eNB and a handover destination eNB starts transmission of user data to the handover destination eNB in parallel with the call admission control stated above when the service quality required by UE is high, thereby mitigating the load according to the processing of transferring user data between both eNBs.

CITATION LIST

Non Patent Literature

NPTL 1: 3GPP TS 36.331, "Radio Resource Control (RRC)", V9.1.0, December, 2009, p. 73

Patent Literature

PTL 1: Japanese Unexamined Patent Application Publication No. 2008-103865
PTL 2: Japanese Unexamined Patent Application Publication No. 2009-171477

SUMMARY OF INVENTION

Technical Problem

However, NPTL 1 and PTL 1 stated above have a problem that the communication quality in the handover destination cell may be reduced according to the execution of the handover by the load distribution function. This is because, when the offset (Ocn) is greatly changed, numerous mobile stations are forcibly handed over to a neighboring cell at one time, which results in congestion of the base station which is a handover destination.

One measure to avoid this problem may include a measure to suppress execution of handover by the load distribution function. However, if this measure is taken, the load in the handover source cell is not reduced at all, resulting in the occurrence of call loss in mobile stations which could not be handed over.

As another reference technique, PTL 2 discloses a soft handoff control technology for establishing a communication path that passes a neighboring cell in addition to a communication path that passes a serving cell when the ratio of the reception quality in the serving cell measured by a mobile station to the reception quality in the neighboring cell exceeds a predetermined threshold. However, it is impossible to deal with the aforementioned problem with this technique, which goes against effective use of radio resources. In the first place, this technique is not suitable for a mobile communication system that employs a hard handover like the LTE.

Accordingly, one exemplary object of the present invention is to reduce the occurrence of call loss in mobile stations while suppressing degradation of communication quality in the handover destination cell.

Solution to Problem

In order to accomplish the exemplary object stated above, a base station according to a first exemplary aspect of the present invention includes a communication means for performing communication with another base station located adjacent to an own station; and a control means for performing call control associated with radio communication with a mobile station. The communication means receives, from the another base station, a first reception quality in a cell formed by the own station and a second reception quality in a cell formed by the another base station, the first reception quality and the second reception quality being measured by one or more mobile stations that are in communication with the another base station. The control means accepts a call associated with a mobile station which satisfies a first condition that the first reception quality is higher than the second reception quality in preference to a call associated with a mobile station which does not satisfy the first condition.

Further, a base station according to a second exemplary aspect of the present invention includes a communication means for performing radio communication with a mobile station; and a request means for requesting another base station located adjacent to an own station to accept a call associated with the mobile station. The communication means receives a first reception quality in a cell formed by the another base station and a second reception quality in a cell formed by the own station, the first reception quality and the second reception quality being measured by one or more mobile stations that are performing radio communication. The request means requests the another base station to accept a call associated with a mobile station which satisfies a first condition that the first reception quality is higher than the second reception quality in preference to acceptance of a call associated with a mobile station which does not satisfy the first condition.

Further, a base station according to a third exemplary aspect of the present invention includes a communication means for performing communication with another base station located adjacent to an own station; and a control means for performing call control associated with radio communication with a mobile station. The communication means receives information regarding a distance between the another base station and one or more mobile stations that are in radio communication with the another base station, the distance being measured by the another base station. The control means accepts a call associated with a mobile station which satisfies a condition that the distance exceeds a threshold in preference to a call associated with a mobile station which does not satisfy the condition.

Furthermore, a base station according to a fourth exemplary aspect of the present invention includes a communication means for performing radio communication with a mobile station; and a request means for requesting another base station located adjacent to an own station to accept a call associated with the mobile station. The communication means measures a distance between the own station and one or more mobile stations that are in radio communication with the own station. The request means requests the another base station to accept a call associated with a mobile station which satisfies a condition that the distance exceeds a threshold in preference to acceptance of a call associated with a mobile station which does not satisfy the condition.

Further, a mobile communication system according to a fifth exemplary aspect of the present invention includes a first base station; and a second base station located adjacent to the first base station. The first base station notifies the second base station of a first reception quality in a cell formed by the second base station and a second reception quality in a cell formed by the first base station, the first reception quality and the second reception quality being measured by one or more mobile stations that are in radio communication with the first base station. The second base station accepts a call associated with a mobile station which satisfies a condition that the first reception quality is higher than the second reception quality in preference to a call associated with a mobile station which does not satisfy the condition.

Further, a mobile communication system according to a sixth exemplary aspect of the present invention includes a first base station; and a second base station located adjacent to the first base station. The first base station receives a first reception quality in a cell formed by the second base station and a second reception quality in a cell formed by the first base station, the first reception quality and the second reception quality being measured by one or more mobile stations that are in radio communication with the first base station. The first base station requests the second base station to accept a call associated with a mobile station which satisfies a condition that the first reception quality is higher than the second reception quality in preference to acceptance of a call associated with a mobile station which does not satisfy the condition.

Furthermore, a mobile communication system according to a seventh exemplary aspect of the present invention includes a first base station; and a second base station located adjacent to the first base station. The first base station measures a distance between the first base station and one or more mobile stations that are in radio communication with the first base station, and notifies the second base station of information regarding the distance. The second base station accepts a call associated with a mobile station which satisfies a condition that the distance exceeds a threshold in preference to a call associated with a mobile station which does not satisfy the condition.

Furthermore, a mobile communication system according to an eighth exemplary aspect of the present invention includes a first base station; and a second base station located adjacent to the first base station. The first base station measures a distance between the first base station and one or more mobile stations that are in radio communication with the first base station, and requesting the second base station to accept a call associated with a mobile station which satisfies a condition that the distance exceeds a threshold in preference to acceptance of a call associated with a mobile station which does not satisfy the condition.

Furthermore, a call admission control method according to a ninth exemplary aspect of the present invention provides a method of controlling call admission in a base station. This call admission control method includes receiving, from another base station located adjacent to the base station, a first reception quality in a cell formed by the base station and a second reception quality in a cell formed by the another base station, the first reception quality and the second reception quality being measured by one or more mobile stations that are in radio communication with the another base station; and accepting a call associated with a mobile station which satisfies a condition that the first reception quality is higher than the second reception quality in preference to a call associated with a mobile station which does not satisfy the condition.

Furthermore, a call admission control method according to a tenth exemplary aspect of the present invention provides a method of controlling call admission in a base station. This call admission control method includes receiving a first reception quality in a cell formed by another base station located adjacent to the base station and a second reception quality in a cell formed by the base station, the first reception quality and the second reception quality being measured by one or more mobile stations that are in radio communication with the base station; and requesting the another base station to accept a call associated with a mobile station which satisfies a condition that the first reception quality is higher than the second reception quality in preference to acceptance of a call associated with a mobile station which does not satisfy the condition.

Further, a call admission control method according to an eleventh exemplary aspect of the present invention provides a method of controlling call admission in a base station. This call admission control method includes receiving, from another base station located adjacent to the base station, information regarding a distance between the another base station and one or more mobile stations that are in radio communication with the another base station; and accepting a call associated with a mobile station which satisfies a condition that the distance exceeds a threshold in preference to a call associated with a mobile station which does not satisfy the condition.

Furthermore, a call admission control method according to a twelfth exemplary aspect of the present invention provides a method of controlling call admission in a base station. This call admission control method includes measuring a distance between the base station and one or more mobile stations that are in radio communication with the base station; and requesting another base station located adjacent to the base station to accept a call associated with a mobile station which satisfies a condition that the distance exceeds a threshold in preference to acceptance of a call associated with a mobile station which does not satisfy the condition.

Furthermore, a call admission control program according to a thirteenth exemplary aspect of the present invention causes a base station to execute the following processing of: receiving, from another base station located adjacent to the base station, a first reception quality in a cell formed by the base station and a second reception quality in a cell formed by the another base station, the first reception quality and the second reception quality being measured by one or more mobile stations that are in radio communication with the another base station, and accepting a call associated with a mobile station which satisfies a condition that the first reception quality is higher than the second reception quality in preference to a call associated with a mobile station which does not satisfy the condition.

Furthermore, a call admission control program according to a fourteenth exemplary aspect of the present invention causes a base station to execute the following processing of: receiving a first reception quality in a cell formed by another base station located adjacent to the base station and a second reception quality in a cell formed by the base station, the first reception quality and the second reception quality being measured by one or more mobile stations that are in radio communication with the base station; and requesting the another base station to accept a call associated with a mobile station which satisfies a condition that the first reception quality is higher than the second reception quality in preference to acceptance of a call associated with a mobile station which does not satisfy the condition.

Further, a call admission control program according to a fifteenth exemplary aspect of the present invention causes a base station to execute the following processing of: receiving, from another base station located adjacent to the base station, information regarding a distance between the another base station and one or more mobile stations that are in radio communication with the another base station; and accepting a call associated with a mobile station which satisfies a condition that the distance exceeds a threshold in preference to a call associated with a mobile station which does not satisfy the condition.

Furthermore, a call admission control program according to a sixteenth exemplary aspect of the present invention causes a base station to execute the following processing of: measuring a distance between the base station and one or more mobile stations that are in radio communication with the base station; and requesting another base station located adjacent to the base station to accept a call associated with a mobile station which satisfies a condition that the distance exceeds a threshold in preference to acceptance of a call associated with a mobile station which does not satisfy the condition.

Advantageous Effects of Invention

According to the present invention, it is possible to reduce the occurrence of call loss in mobile stations while suppressing degradation of communication quality in a handover destination cell.

The first reasons is that, when a plurality of mobile stations execute handover by the load distribution function, mobile stations where there is a high necessity for handover (that should preferably be handed over even when the load distribution is not executed) are preferentially handed over, so that it is possible to avoid the occurrence of congestion in a base station which is a handover destination.

The second reason is that mobile stations where there is a low necessity for handover (that should preferably not be handed over originally) are continuously communicated in the original cell, so that it is possible to avoid an increase in the call loss rate.

BRIEF DESCRIPTION OF DRAWINGS

FIG. 5 is a diagram showing a configuration example of a load increase amount estimation table used in the base station according to the first exemplary embodiment of the present invention;

DESCRIPTION OF EMBODIMENTS

Hereinafter, with reference to FIGS. 1 to 13, first to fifth exemplary embodiments of a base station according to the present invention and a mobile communication system to which this base station is applied will be described. Throughout the drawings, the same components are denoted by the same reference symbols, and overlapping description will be omitted as appropriate for the sake of clarification of description.

Further, in each exemplary embodiment, a mobile communication system compliant with the LTE will be described as an example. However, the technique shown in each exemplary embodiment may be applied not only to a mobile communication system compliant with the LTE but also to a mobile communication system compliant with another communication standard employing a hard handover.

[First Exemplary Embodiment]

Figure 1:
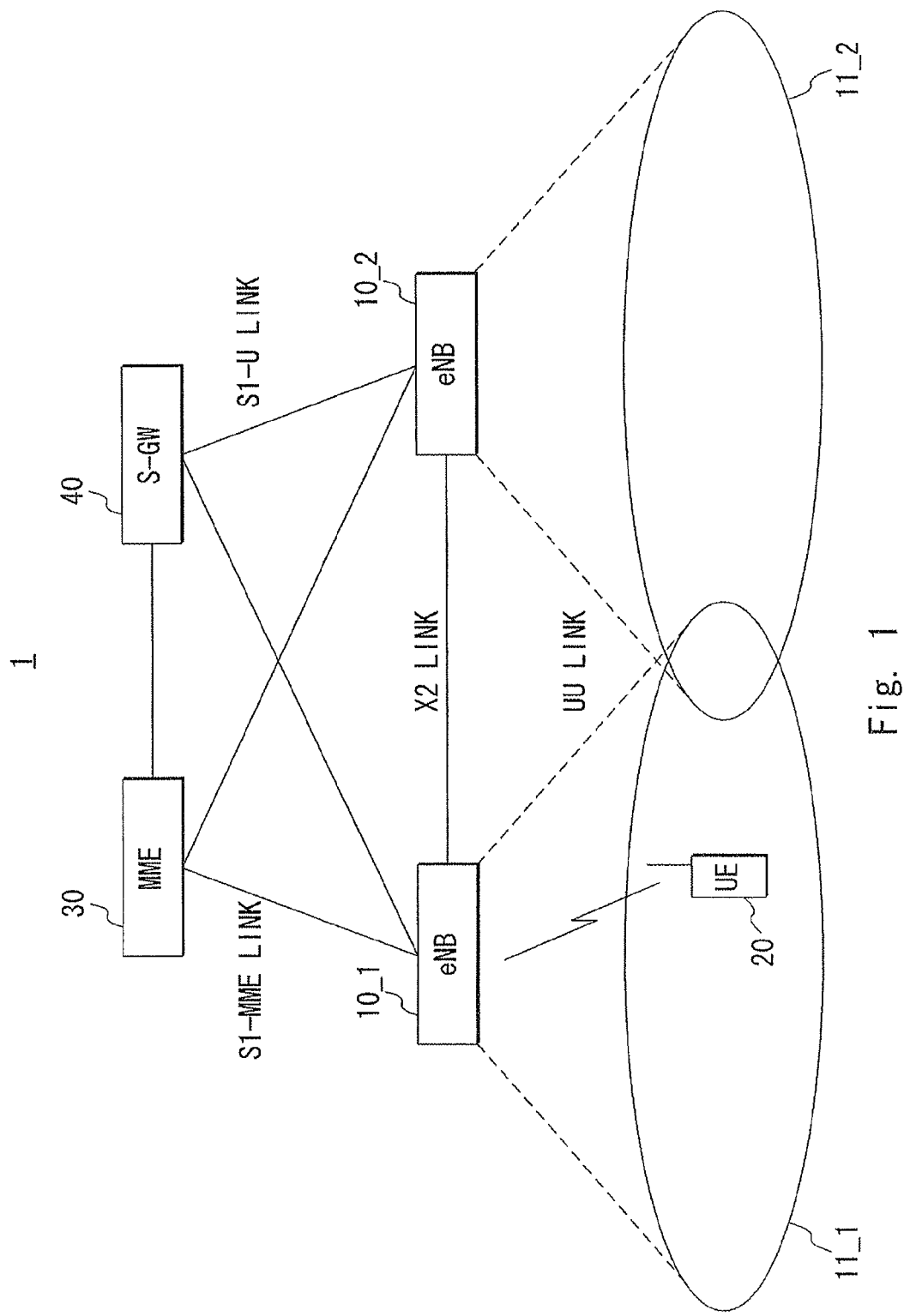
FIG. 1 is a block diagram showing a configuration example of a mobile communication system according to a first exemplary embodiment of the present invention.

As shown in FIG. 1, a mobile communication system 1 according to this exemplary embodiment includes two eNBs 10_1 and 10_2 (hereinafter sometimes collectively denoted by the numeral 10) that are located adjacent to each other, a UE 20, an MME (Mobility Management Entity) 30, and an S-GW (Serving Gateway) 40. The eNB 10 and the MME 30 are connected by an S1-MME link. Further, the eNB 10 and the S-GW 40 are connected by an S1-U link. Further, the eNB 10_1 and the eNB 10_2 are connected by an X2 link. Furthermore, a radio section between the eNB 10 and the UE 20 is typically referred to as an UU link. In the following description, the S1-MME link and the S1-U link may collectively be referred to as an S1 link. Further, the S1 link and the X2 link may collectively be referred to as a Backhaul link.

Among them, typical UE, MME, and S-GW compliant with the LTE can be used for the UE 20, the MME 30, and the S-GW 40, respectively. Thus, detailed description thereof will be omitted.

Figure 2:
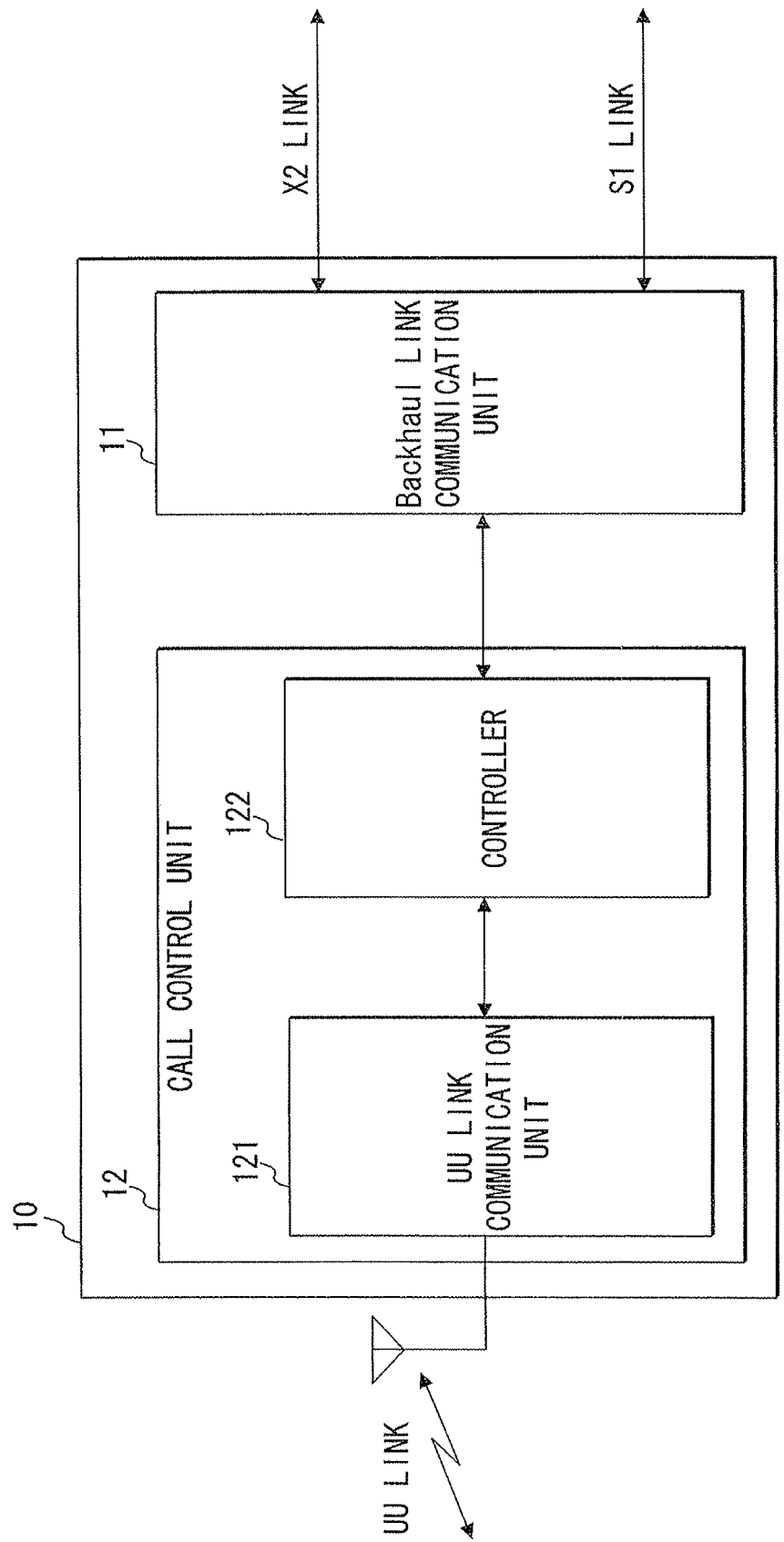
FIG. 2 is a block diagram showing a configuration example of a base station according to the first exemplary embodiment of the present invention.

Meanwhile, as shown in FIG. 2, the eNB 10 includes a Backhaul link communication unit 11 and a call control unit 12.

The Backhaul link communication unit 11 performs communication with a neighboring eNB via the X2 link, and performs communication with at least one of the MME 30 and the S-GW 40 via the S1 link.

Further, roughly speaking, the call control unit 12 performs call control associated with radio communication with the UE 20. Specifically, the call control unit 12 includes a UU link communication unit 121 and a controller 122. The UU link communication unit 121 performs radio communication with the UE 20 via the UU link. The controller 122 controls the Backhaul link communication unit 11 and the UU link communication unit 121, thereby performing call admission control and signaling associated with a handover. The eNB 10 also has a function of allocating radio resources to the UE 20 using PF scheduling, as is similar to the typical eNB compliant with the LTE.

Next, an operation of this exemplary embodiment will be described. First, with reference to FIGS. 3 to 6, an example of the procedure of a handover when the X2 link is used (hereinafter referred to as an X2 handover) will be described in detail. Then, with reference to FIG. 7, an example of the procedure of a handover when the S1 link is used (hereinafter referred to as an S1 handover) will be described in detail.

In both handover procedures, description will be made taking as an example a case in which the eNB 10_1 shown in FIG. 1 is a handover source eNB (a cell 11_1 formed by the eNB 10_1 is a handover source cell), and the eNB 10_2 is a handover destination eNB (a cell 11_2 formed by the eNB 10_2 is a handover destination cell).

[Example of X2 Handover Procedure]

Figure 3:
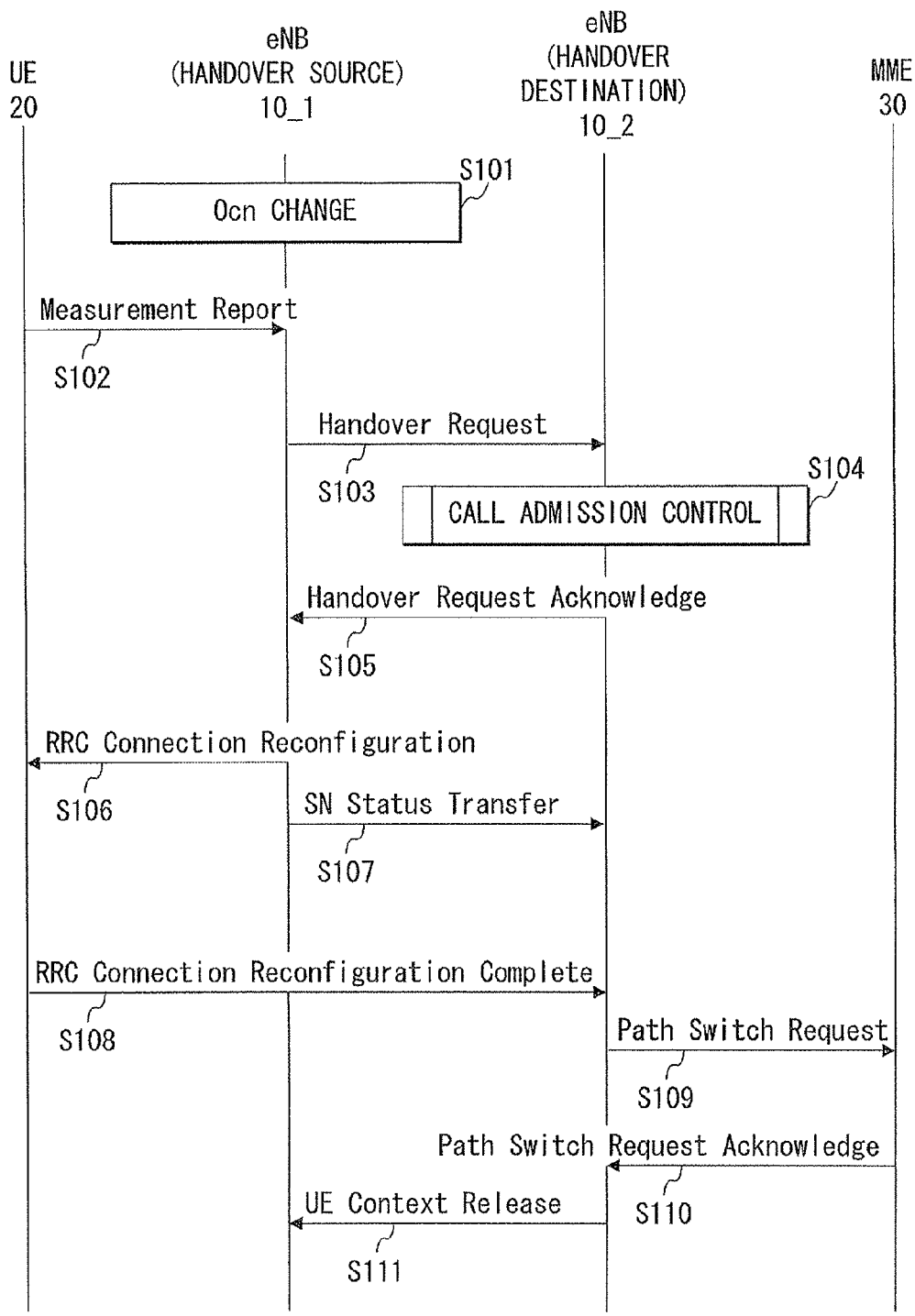
FIG. 3 is a sequence diagram showing an X2 handover procedure in the mobile communication system according to the first exemplary embodiment of the present invention.

As shown in FIG. 3, when the load of the eNB 10_1 becomes higher (e.g., when the number of UE connected to the eNB 10_1 increases), the eNB 10_1 changes the above offset Ocn, and includes the change in broadcast information or a control signal to notify it to the UE 20 (Step S101).

At this time, the UE 20 measures a reception quality Mn in the neighboring cell 11_2 and a reception quality Ms in the serving cell 1. When the condition shown in the above equation (1) is satisfied, the UE 20 transmits Event A3 including the reception qualities Mn and Ms to the eNB 10_1 (Step S102). In summary, according to the change in the offset Ocn (load distribution function), Event A3 may be transmitted even when the reception quality Mn in the neighboring cell 11_2 does not exceed the reception quality Ms in the serving cell 11_1. In the following description, only Event A3 is treated as Measurement Report. The reception quality may either be RSRP (Reference Signal Received Power) or RSRQ (Reference Signal Received Quality).

Upon receiving the Measurement Report, the handover source eNB 10_1 transmits Handover Request including the reception qualities Mn and Ms to the handover destination eNB 10_2 (Step S103). The handover source eNB 10_1 may include the difference between the reception qualities Mn and Ms in the Handover Request to be transmitted to the handover destination eNB 10_2.

Figure 4:
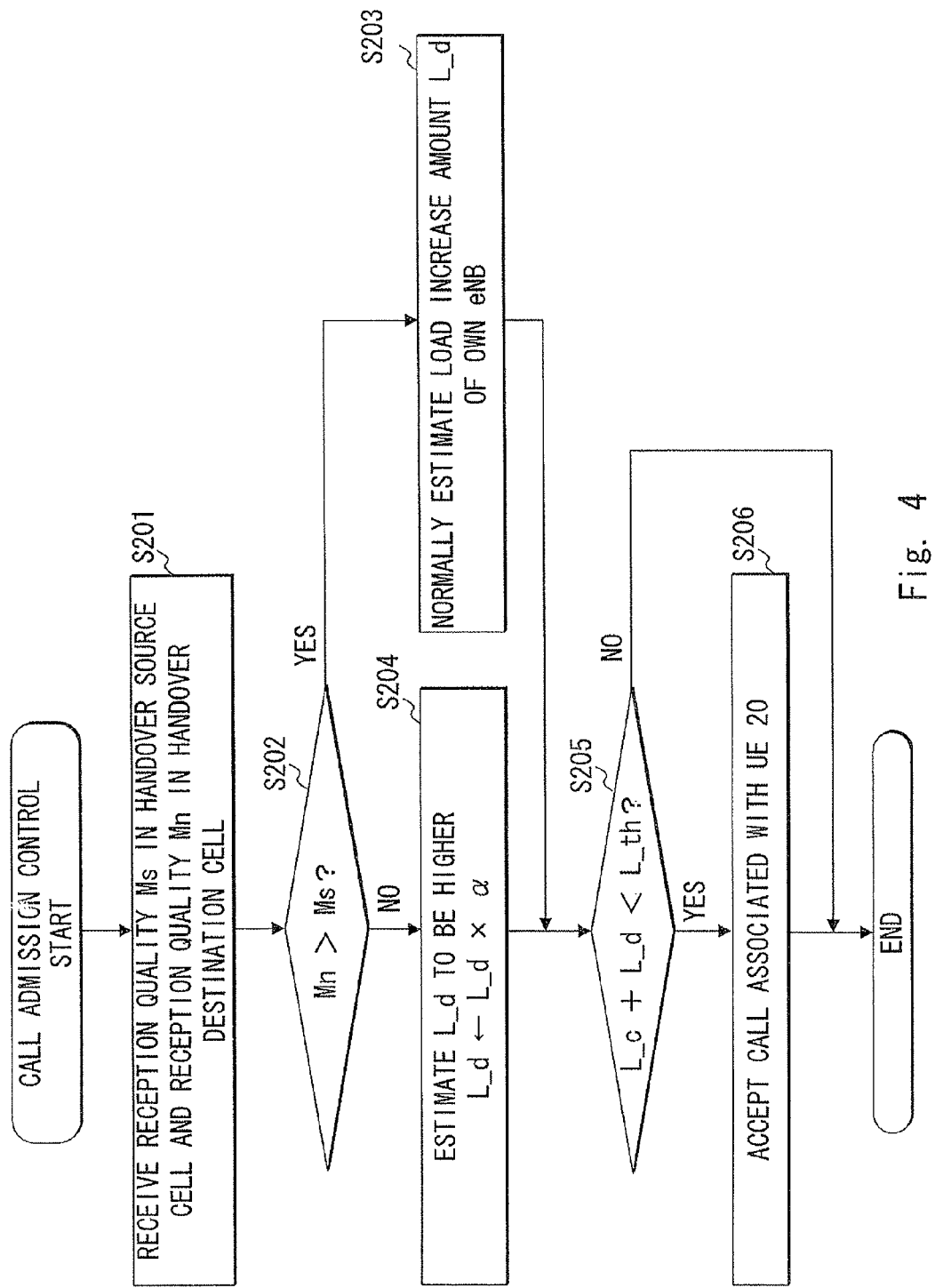
FIG. 4 is a flowchart showing one example of call admission control in the base station according to the first exemplary embodiment of the present invention.

Upon receiving the Handover Request, the handover destination eNB 10_2 performs call admission control as shown in FIG. 4 (Step S104).

Specifically, the Backhaul link communication unit 11 in the handover destination eNB 10_2 receives the Handover Request via the X2 link. Further, the controller 122 in the call control unit 12 extracts, from the Handover Request, the reception quality Ms in the handover source cell 11_1 and the reception quality Mn in the handover destination cell 11_2 (Step S201).

The controller 122 then compares the reception qualities Ms and Mn, to determine whether the reception quality Mn is higher than the reception quality Ms (Step S202).

As a result, when Mn>Ms is established, the controller 122 determines that the UE 20 is the UE where there is a high necessity for handover (which should preferably be handed over even when the load distribution is not executed). The controller 122 then normally estimates a load increase amount L_d of the own eNB 10_2 when the call associated with the UE 20 is accepted (Step S203). The phrase "normally estimate" means to estimate the load increase amount L_d, as is similar to the case of a normal handover operation which is not performed by the load distribution. For example, it is preferable that the controller 122 refers to a load increase amount estimation table 123 shown in FIG. 5 to determine the load increase amount L_d according to a bit rate required by the UE 20. In the table 123, the load increase amount L_d is a relative load amount when the upper-limit load amount of the eNB 10_2 (in other words, total resource amount) is defined as "1", and indicates that as the required bit rate is higher, the load increases when the call is accepted.

Meanwhile, when Mn≤Ms is established at the above Step S202, the controller 122 determines that the UE 20 is the UE which has been forcibly handed over according to the execution of the load distribution (in other words, the UE where communication is performed in good condition in the handover source cell 10_1, and there is a low necessity for handover). The controller 122 then estimates the load increase amount L_d to be higher compared to the above Step S203 (Step S204). More specifically, as shown in FIG. 5, the controller 122 multiplies the load increase amount in the normal handover operation by a coefficient α ("1.2" in the example shown in FIG. 5) which is larger than "1", to estimate the load increase amount L_d.

The controller 122 then determines whether it is possible to accept a new call according to the above formula (2) (Step S205).

When the condition shown in the above equation (2) is satisfied (when the sum of the current load amount L_c in the eNB 10_2 and the load increase amount L_d estimated at the above Step S203 or S204 does not exceed the call admission threshold L_th), the controller 122 accepts the call associated with the UE 20 (Step S206). When the UE 20 holds a plurality of bearers, the controller 122 performs call admission control for each bearer. When the controller 122 receives Measurement Report from a plurality of UE, the controller 122 performs call admission control for each UE.

Meanwhile, when the condition shown in the above equation (2) is not satisfied, the controller 122 does not accept the call associated with the UE 20 and ends the processing.

Referring back to FIG. 3, the handover destination eNB 10_2 transmits Handover Request Acknowledge indicating the results of the call admission control (whether it is possible to accept the call) to the handover source eNB 10_1 via the X2 link (Step S105).

When the Handover Request Acknowledge indicates "call admission possible", the handover source eNB 10_1 transmits RRC Connection Reconfiguration to the UE 20, to thereby request the UE 20 to execute the handover (Step S106).

In parallel to this, the handover source eNB 10_1 transmits SN Status Transfer to the handover destination eNB 10_2, to thereby notify the handover destination eNB 10_2 of the sequence number of the packet which has been used in the communication with the UE 20 (Step S107). Accordingly, the occurrence of missing or duplication can be avoided in the packet transmission from the handover destination eNB 10_2.

Meanwhile, the UE 20 transmits RRC Connection Reconfiguration Complete to the handover destination eNB 10_2, thereby notifying that the handover has been completed (Step S108).

The handover destination eNB 10_2 then transmits Path Switch Request to the MME 30 (via the S-GW 40 shown in FIG. 1 as necessary), thereby requesting the MME 30 to switch the path between the MME 30 and the UE 20 (Step S109).

The MME 30 switches the path, and transmits Path Switch Request Acknowledge indicating the completion of the switch to the handover destination eNB 10_2 (Step S110).

The handover destination eNB 10_2 then transmits UE Context Release to the handover source eNB 10_1, thereby requesting the handover source eNB 10_1 to delete the information regarding the UE 20 (Step S111).

In this way, in this exemplary embodiment, the call associated with the UE which has been forcibly handed over according to the execution of the load distribution is less likely to be accepted by the handover destination eNB. In other words, the number of UE that perform the handover can be suppressed. Accordingly, it is possible to prevent occurrence of congestion in the handover destination eNB.

Further, the UE in which reception quality in the handover source cell is equal to or higher than the reception quality in the handover destination cell can continue the communication in the handover source cell. Thus, even when the acceptance of call is rejected by the handover destination eNB, there is a low probability that call loss occurs in the UE (i.e., it is possible to avoid the increase in the call loss rate).

Accordingly, it is possible to reduce the occurrence of call loss in the UE while suppressing degradation of communication quality in the handover destination cell.

Further, in this exemplary embodiment, the load increase amount when the call associated with the UE which has been forcibly handed over according to the execution of the load distribution is accepted is estimated to be higher, so that the related determination processing shown in the above equation (2) can be used. Accordingly, it is possible to suppress an amount of modification (a cost of modification) to existing eNBs when this exemplary embodiment is applied.

Figure 6:
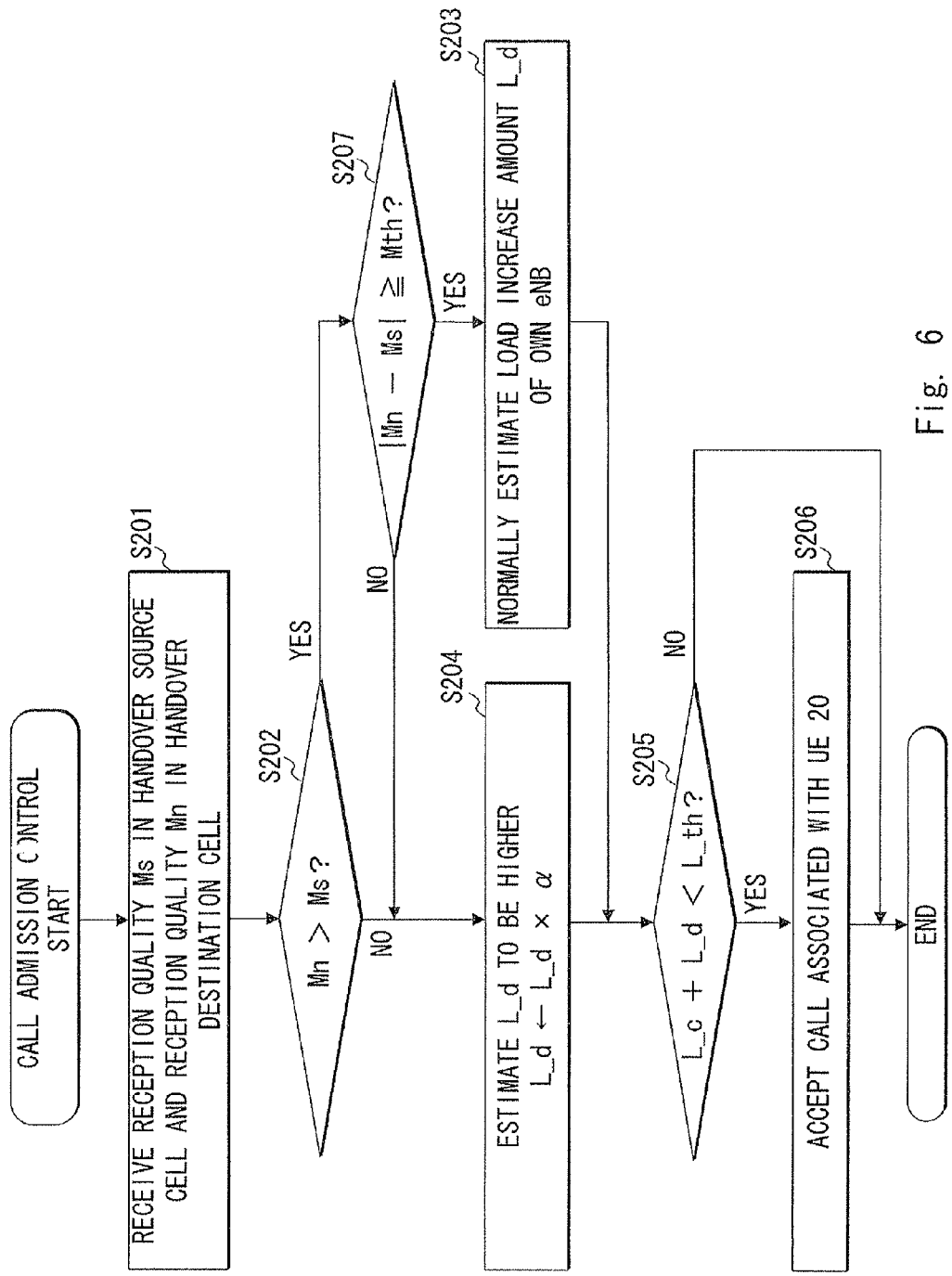
FIG. 6 is a flowchart showing another example of the call admission control in the base station according to the first exemplary embodiment of the present invention.

Further, the handover destination eNB may perform call admission control as shown in FIG. 6. In this case, the handover destination eNB can preferentially accept a call associated with UE where there is a high necessity for handover.

Specifically, the controller 122 in the handover destination eNB executes Step S207 in addition to Steps S201-S206 shown above in FIG. 4. In summary, when Mn>Ms is established at the above Step S202, the controller 122 compares the difference between the reception qualities Mn and Ms with a predetermined threshold Mth (Step S207).

As a result, when |Mn−Ms|≥Mth is established, the controller 122 determines that the UE 20 is the UE in which communication quality can be sufficiently improved by a handover. Then the process goes to the above Step S203, where the load increase amount L_d is normally estimated.

Meanwhile, when |Mn−Ms|<Mth is established, the controller 122 determines that the UE 20 is the UE in which communication quality is not changed so much even when a handover is performed (in other words, the UE which causes no problem even when the communication is continued in the handover source cell). Then the process goes to the above Step S204, where the load increase amount L_d is estimated to be higher.

[Example of S1 Handover Procedure]

Figure 7:
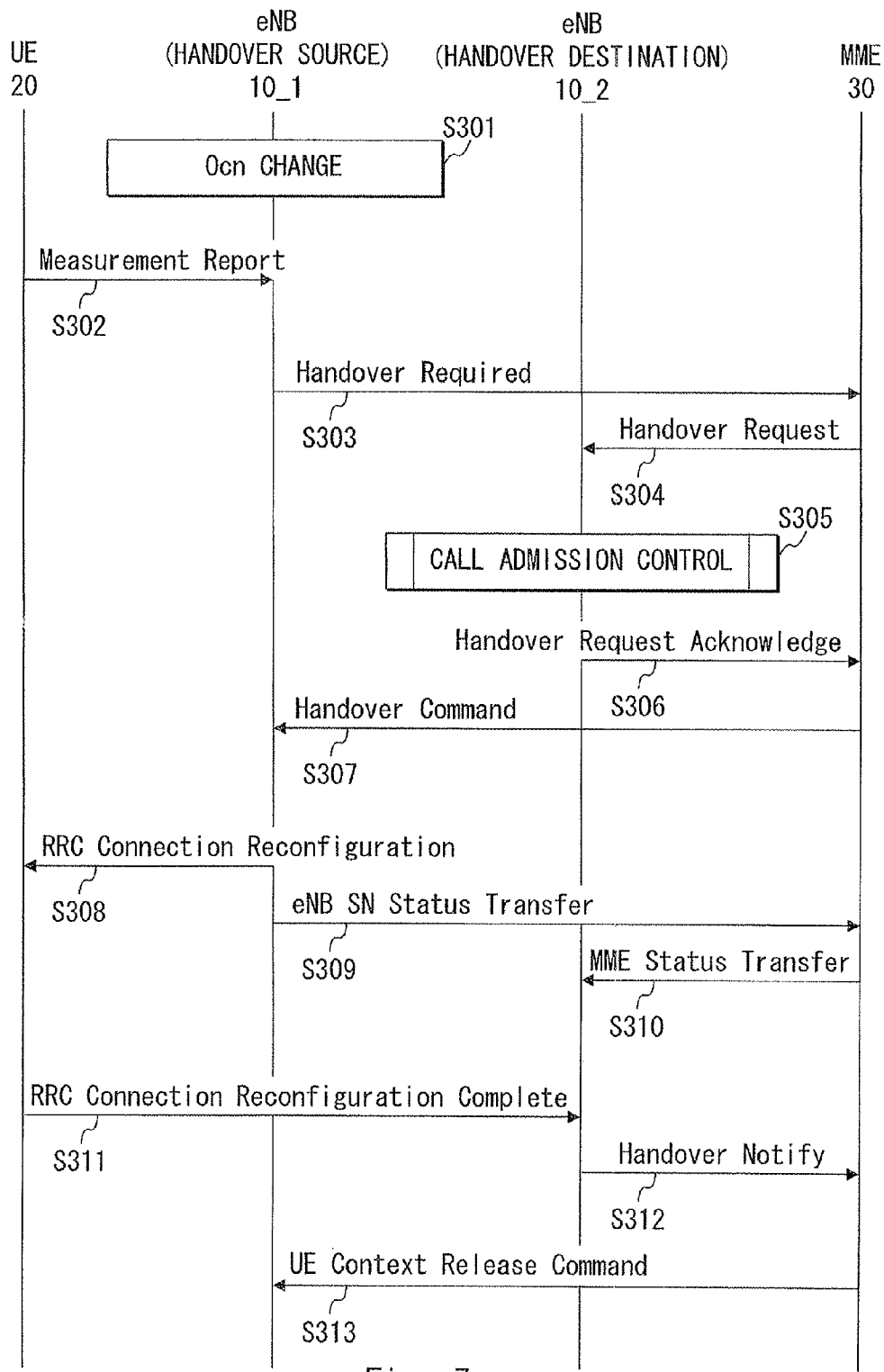
FIG. 7 is a sequence diagram showing an S1 handover procedure in the mobile communication system according to the first exemplary embodiment of the present invention.

As shown in FIG. 7, when the load of the eNB 10_1 becomes higher, the eNB 10_1 changes the offset Ocn, and includes the change in broadcast information or a control signal to notify it to the UE 20 (Step S301).

At this time, the UE 20 measures the reception quality Mn in the neighboring cell 11_2 and the reception quality Ms in the serving cell 11_1. When the condition shown in the above equation (1) is satisfied, the UE 20 transmits Measurement Report including the reception qualities Mn and Ms to the eNB 10_1 (Step S302).

In the case of using the S1 link, the handover source eNB 10_1 transmits Handover Required including the reception qualities Mn and Ms to the MME 30 (via the S-GW 40 as shown in FIG. 1 as necessary) (Step S303).

The MME 30 transmits Handover Request including the reception qualities Mn and Ms to the handover destination eNB 10_2 (Step S304).

Upon receiving the Handover Request, the handover destination eNB 10_2 performs the call admission control as shown in FIG. 4 or 6 using the reception qualities Mn and Ms (Step S305). The handover destination eNB 10_2 then transmits Handover Request Acknowledge indicating the result of the call admission control to the MME 30 (Step S306).

The MME 30 transmits Handover Command to the handover source eNB 10_1, thereby notifying the handover source eNB 10_1 of the result of the call admission control by the handover destination eNB 10_2 (Step S307).

When the Handover Command indicates "call admission possible", the handover source eNB 10_1 transmits RRC Connection Reconfiguration to the UE 20, thereby requesting the UE 20 to execute a handover (Step S308).

In parallel to this, the handover source eNB 10_1 transmits eNB SN Status Transfer to the MME 30, thereby notifying the MME 30 of the sequence number of the packet which has been used in the communication with the UE 20 (Step S309).

The MME 30 transmits MME Status Transfer to the handover destination eNB 10_2, thereby transferring the sequence number notified from the handover source eNB 10_1 (Step S310). Accordingly, the occurrence of missing or duplication can be avoided in the packet transmission from the handover destination eNB 10_2.

Meanwhile, the UE 20 transmits RRC Connection Reconfiguration Complete to the handover destination eNB 10_2, thereby notifying that the handover has been completed (Step S311).

The handover destination eNB 10_2 then transmits HandoverNotify to the MME 30, thereby notifying the completion of the handover by the UE 20 (Step S312).

The MME 30 transmits UE Context Release Command to the handover source eNB 10_1, thereby requesting the handover source eNB 10_1 to delete the information regarding the UE 20 (Step S313).

In this way, as is similar to the case of the X2 handover, such effects can be achieved that it is possible to reduce the occurrence of call loss in UE while suppressing degradation of communication quality in the handover destination cell, and to further preferentially accept a call associated with UE where there is a high necessity for handover.

[Second Exemplary Embodiment]

Figure 8:
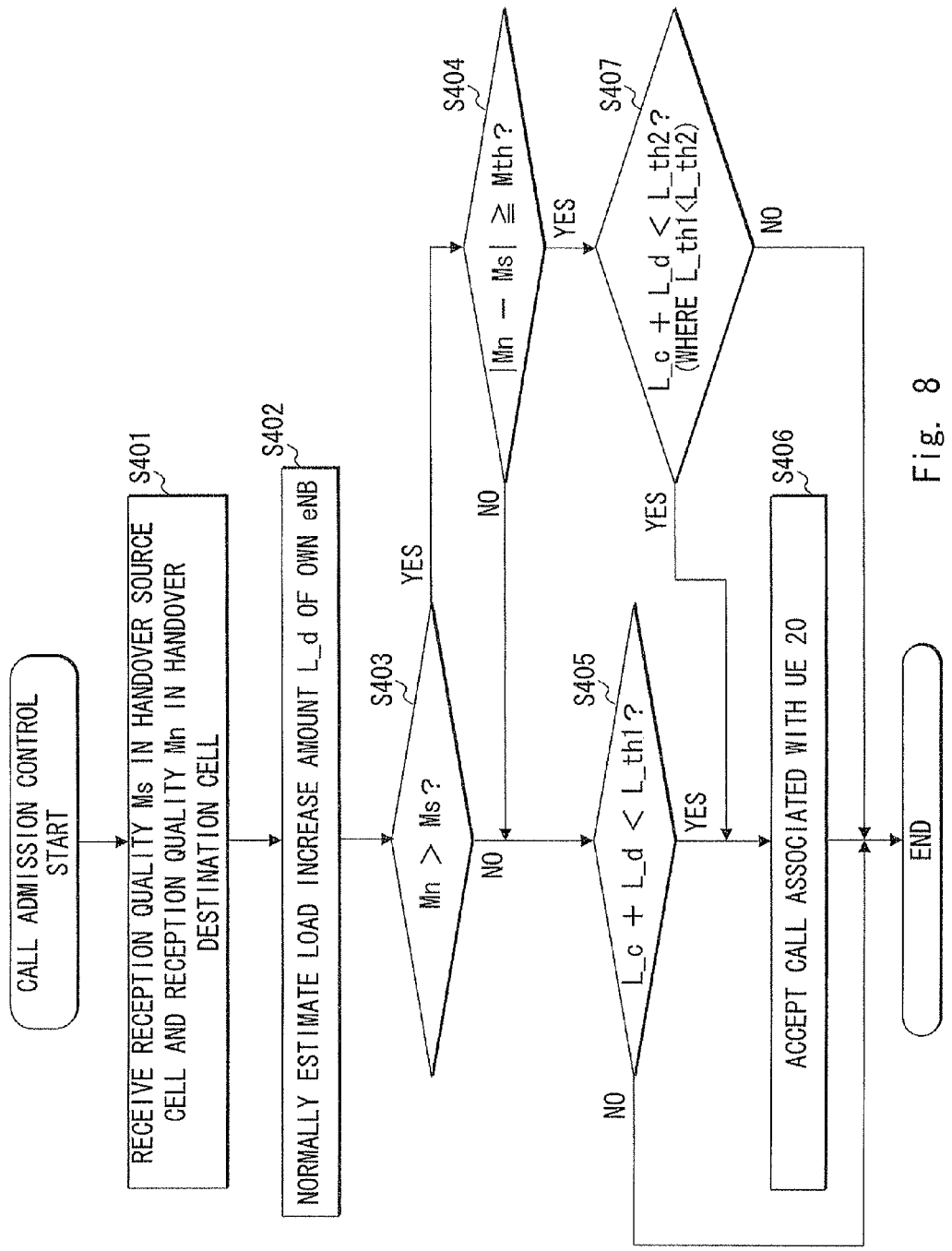
FIG. 8 is a flowchart showing an example of call admission control in a base station according to a second exemplary embodiment of the present invention.

A mobile communication system according to this exemplary embodiment can be formed as is similar to FIG. 1. Further, an eNB according to this exemplary embodiment can be formed as is similar to FIG. 2. However, the eNB according to this exemplary is different from that of the first exemplary embodiment in that the controller 122 in the eNB 10 executes call admission control as shown in FIG. 8.

Specifically, as is similar to the call admission control shown above in FIG. 4 or 6, the controller 122 receives the reception quality Ms in the handover source cell and the reception quality Mn in the handover destination cell via the Backhaul link communication unit 11 (Step S401).

At this time, the controller 122 normally estimates the load increase amount L_d as is different from the call admission control stated above (Step S402). In summary, the controller 122 equally estimates the load increase amount for each UE without making any distinction. When the estimation is performed, the table 123 shown in FIG. 5 may be used.

The controller 122 then compares the reception qualities Ms and Mn, to determine whether the reception quality Mn is higher than the reception quality Ms (Step S403). As a result, when Mn>Ms is established, the controller 122 further determines whether the difference |Mn−Ms| between the reception qualities Mn and Ms is equal to or larger than the threshold Mth (Step S404).

When Mn≤Ms is established at the above Step S403, or when |Mn−Ms|<Mth is established at the above Step S404, the controller 122 determines whether the sum of the current load amount L_c in the own eNB 10 and the load increase amount L_d estimated at the above Step S402 exceeds a call admission threshold L_th1 defined for the UE which has been forcibly handed over according to the execution of the load distribution (Step S405).

As a result, when L_c+L_d<L_th1 is established, the controller 122 accepts the call associated with the UE 20 (Step S406). In contrast, when L_c+L_d≥L_th1 is established, the controller 122 does not accept the call associated with the UE 20 and ends the processing.

Meanwhile, when Mn>Ms and |Mn−Ms|≥Mth are both established at the above Steps S403 and S404, the controller 122 determines whether the sum of the current load amount L_c and the load increase amount L_d exceeds a call admission threshold L_th2 (L_th1<L_th2) defined for the UE which should preferably be handed over even when the load distribution is not executed (Step S407).

As a result, when $L\_c+L\_d<L\_th2$ is established, the controller 122 goes to the above Step S406, to accept the call associated with the UE 20 (Step S406). Meanwhile, when $L\_c+L\_d\geq L\_th2$ is established, the controller 122 does not accept the call associated with the UE 20 and ends the processing.

In this way, in this exemplary embodiment, when the load distribution is executed, the call associated with the UE where the necessity for handover is high is more likely to be accepted by the handover destination eNB. In contrast, the call associated with the UE where the necessity for handover is low is less likely to be accepted by the handover destination eNB.

Accordingly, as is similar to the first exemplary embodiment stated above, such effects can be achieved that it is possible to reduce the occurrence of call loss in UE while suppressing degradation of communication quality in the handover destination cell, and to further preferentially accept a call associated with UE where there is a high necessity for handover.

Note that the above Step S404 may not necessarily be performed. The controller 122 may selectively execute one of the above Steps S405 and S407 according only to the determination result at the above Step S403. Also in this case, such effects can be achieved that it is possible to reduce the occurrence of call loss in UE while suppressing degradation of communication quality in the handover destination cell.

[Third Exemplary Embodiment]

A mobile communication system according to this exemplary embodiment can be formed as is similar to FIG. 1. However, an eNB according to this exemplary embodiment is different from that of the first exemplary embodiment in that it is formed as shown in FIG. 9.

Figure 9:
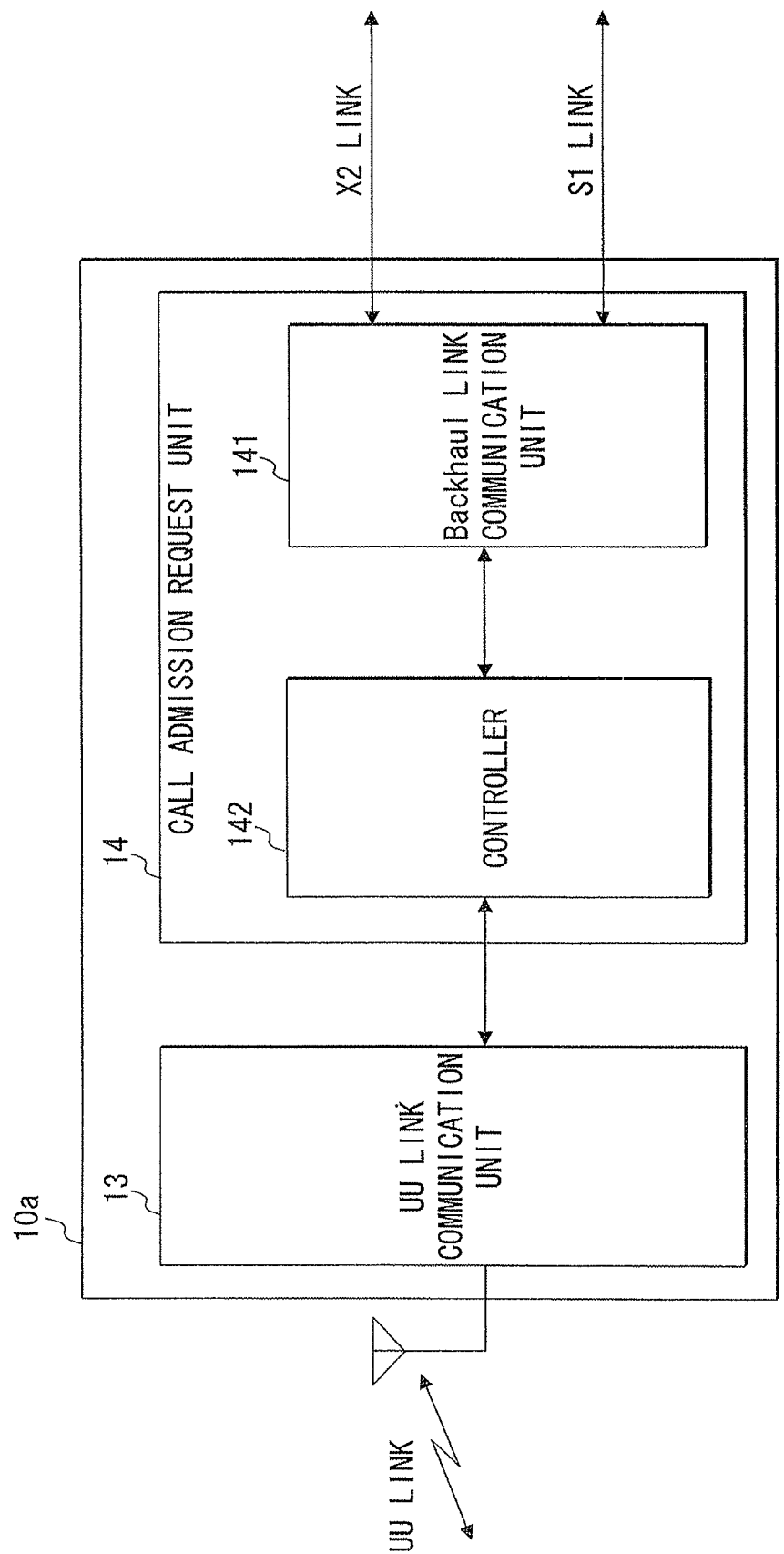
FIG. 9 is a block diagram showing a configuration example of a base station according to a third exemplary embodiment of the present invention.

Specifically, an eNB 10a shown in FIG. 9 includes a UU link communication unit 13 and a call admission request unit 14.

The UU link communication unit 13 performs radio communication with the UE 20 via the UU link.

Meanwhile, roughly speaking, the call admission request unit 14 determines whether it is possible to accept a call associated with the UE 20 in place of the handover destination eNB, and requests the handover destination eNB to accept the call according to the determination result (hereinafter, this series of processing will be referred to as "call admission request processing"). Specifically, the call admission request unit 14 includes a Backhaul link communication unit 141 and a controller 142. The Backhaul link communication unit 141 performs communication with the handover destination eNB via the X2 link, and performs communication with at least one of the MME 30 and the S-GW 40 via the S1 link. The controller 142 controls the UU link communication unit 13 and the Backhaul link communication unit 141, thereby as will be described later, executing the call admission request processing.

Next, with reference to FIGS. 10 and 11, an example of an operation of this exemplary embodiment will be described in detail.

Figure 10:
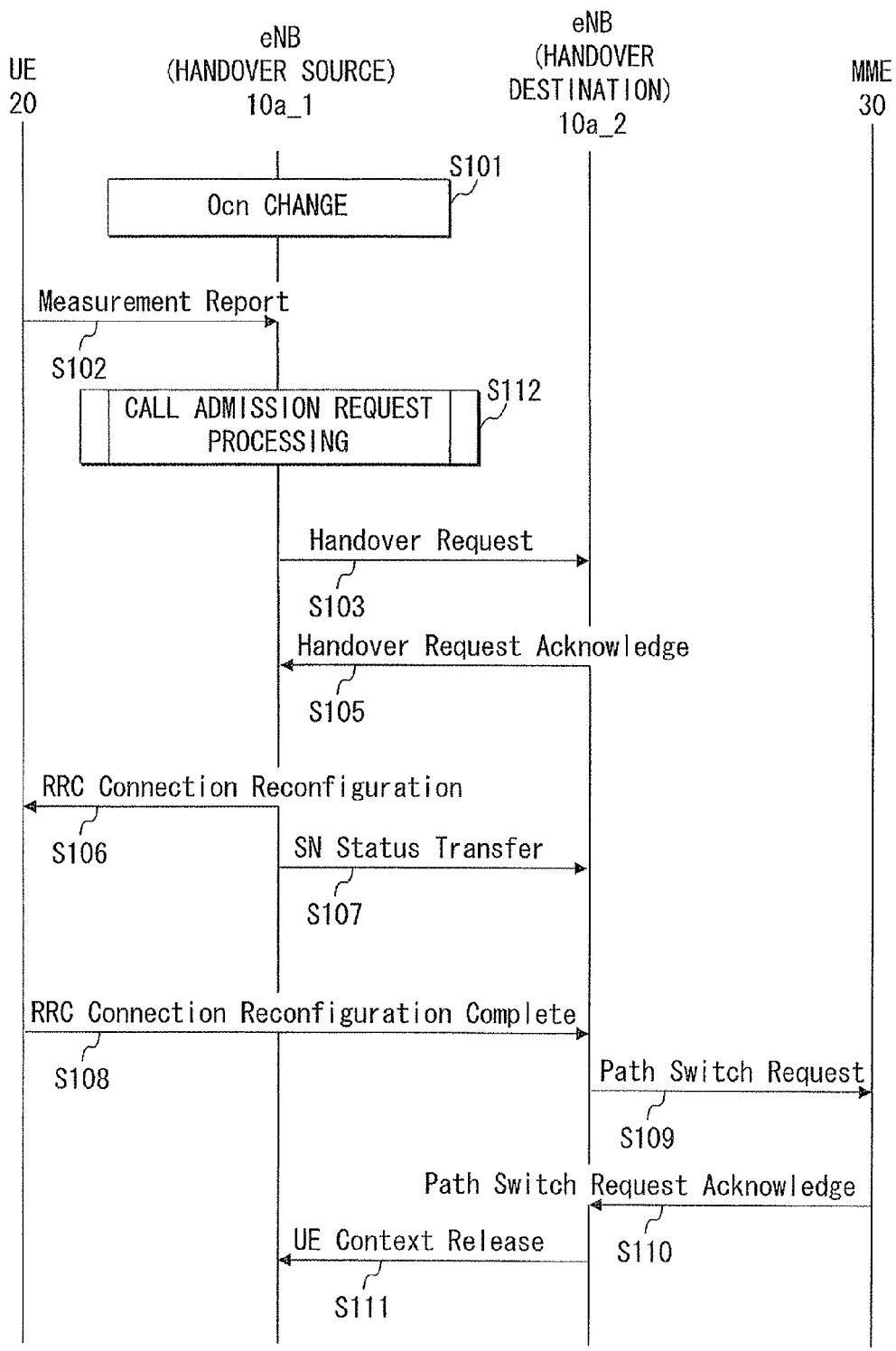
FIG. 10 is a sequence diagram showing an X2 handover procedure in a mobile communication system according to the third exemplary embodiment of the present invention.

In the example of the X2 handover procedure shown in FIG. 10, Step S112 is executed instead of Step S104 shown above in FIG. 3.

When the load of a handover source eNB 10a_1 becomes higher, as is similar to the above Step S101 in FIG. 3, the handover source eNB 10a_1 changes the offset Ocn, and includes the change in broadcast information or a control signal to notify it to the UE 20. Further, as is similar to the above Step S102, the UE 20 measures the reception qualities Mn and Ms and transmits Measurement Report including the reception qualities Mn and Ms that are measured to the handover source eNB 10a_1.

Figure 11:
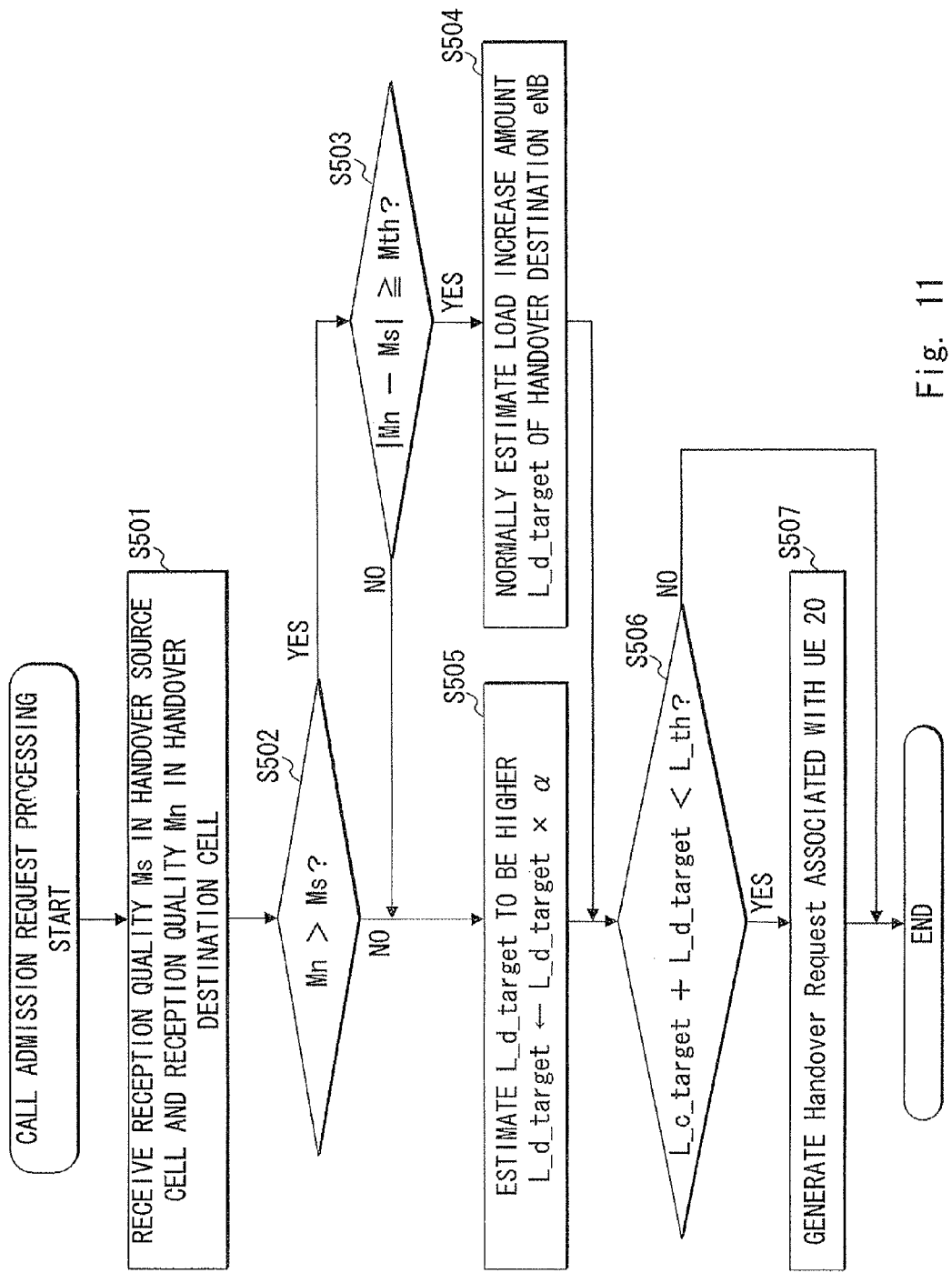
FIG. 11 is a flowchart showing an example of call admission request processing in the base station according to the third exemplary embodiment of the present invention.

Upon receiving the Measurement Report, the handover source eNB 10a_1 executes the call admission request processing as shown in FIG. 11 prior to transmission of Handover Request to a handover destination eNB 10a_2 (Step S112).

Specifically, the UU link communication unit 13 in the handover source eNB 10_1 receives the Measurement Report via the UU link. Further, the controller 142 in the call admission request unit 14 extracts, from the Measurement Report, the reception quality Ms in the handover source cell and the reception quality Mn in the handover destination cell (Step S501).

The controller 142 then compares the reception qualities Ms and Mn, to determine whether the reception quality Mn is higher than the reception quality Ms (Step S502). As a result, when Mn>Ms is established, the controller 142 further determines whether the difference |Mn−Ms| between the reception qualities Mn and Ms is equal to or larger than the threshold Mth (Step S503).

When |Mn−Ms|≥Mth is established at the above Step S503, the controller 142 normally estimates a load increase amount L_d_target when the handover destination eNB 10a_2 accepts the call associated with the UE 20 (Step S504). For example, the controller 142 may refer to the load increase amount estimation table 123 shown in FIG. 5 to estimate the load increase amount L_d_target.

Meanwhile, when Mn≤Ms is established at the above Step S503 or |Mn−Ms|<Mth is established at the above Step S504, the controller 142 estimates the load increase amount L_d_target to be higher compared to the above Step S504 (Step S504). For example, the controller 142 multiplies the load increase amount in the normal handover operation by the coefficient α stated above, thereby estimating the load increase amount L_d_target.

The controller 142 then determines whether the handover destination eNB 10a_2 can accept a new call according to the following equation (3) (Step S506).

$$L\_c\_target+L\_d\_target<L\_th \quad (3)$$

In the above equation (3), L_c_target denotes the current load amount in the handover destination eNB 10a_2. This load amount L_c_target is received by the Backhaul link communication unit 141 from the handover destination eNB 10a_2, regularly (e.g., for each sub-frame).

When the condition shown in the above equation (3) is satisfied, the controller 142 determines that the handover destination eNB 10a_2 can accept the call associated with the UE 20, to generate Handover Request associated with the UE 20 (Step S507). In the case of the S1 handover, the controller 142 generates Handover Required stated above shown in FIG. 7.

Meanwhile, when the condition shown in the above equation (3) is not satisfied, the controller 142 determines that the handover destination eNB 10a_2 cannot accept the call associated with the UE 20. Then, the controller 142 does not generate Handover Request and ends the processing.

Referring back to FIG. 10, when the Handover Request is generated in the call admission request processing stated above, the handover source eNB 10a_1 goes to Step S103 shown above in FIG. 3, to transmit the Handover Request to the handover destination eNB 10a_2. When the Handover Required is generated, the handover source eNB 10a_1 goes to Step S303 shown above in FIG. 7, to transmit the Handover Required to the MME 30.

The handover destination eNB 10a_2 goes to the above Step S105 without performing the call admission control, to immediately transmit Handover Request Acknowledge to the handover source eNB 10a_1. In the case of the S1 handover, upon receiving the Handover Request from the MME 30, the handover destination eNB 10a_2 goes to Step S306 shown above in FIG. 7 without performing the call admission control, to immediately transmit Handover Request Acknowledge to the MME 30.

In this way, as is similar to FIG. 3, the sequence according to the subsequent Steps S106-S111 is executed, whereby the UE 20 is handed over to the eNB 10a_2. In the case of the S1 handover, as is similar to FIG. 7, the sequence according to the subsequent Steps S307-S313 is executed, whereby the UE 20 is handed over to the eNB 10a_2 as well.

In this way, in this exemplary embodiment, when the load distribution is executed, the admission of the call associated with the UE where the necessity for handover is high is more likely to be requested to the handover destination eNB. In contrast, the admission of the call associated with the UE where the necessity for handover is low is less likely to be requested to the handover destination eNB.

Accordingly, as is similar to the first and second exemplary embodiments described above, such effects can be achieved that it is possible to reduce the occurrence of call loss in UE while suppressing degradation of communication quality in the handover destination cell, and to further preferentially accept the call associated with the UE where the necessity for handover is higher.

In addition, since the handover source eNB determines whether it is possible to accept a call, there is an advantage that time required for the call admission control is shorter compared to that in the first and second exemplary embodiments. Thus, this exemplary embodiment is suitable for a case in which the UE is moving at high speed. Meanwhile, the first and second exemplary embodiments stated above have such an advantage that the traffic load of the X2 link or the S1 link is lower compared to that in this exemplary embodiment.

The above Step S503 is not necessarily performed. The controller 142 may selectively execute one of the above Steps S504 and S505 according only to the determination result at the above Step S502. Even in this case, such effects can be achieved that it is possible to reduce the occurrence of call loss in UE while suppressing degradation of communication quality in the handover destination cell.

[Fourth Exemplary Embodiment]

Figure 12:
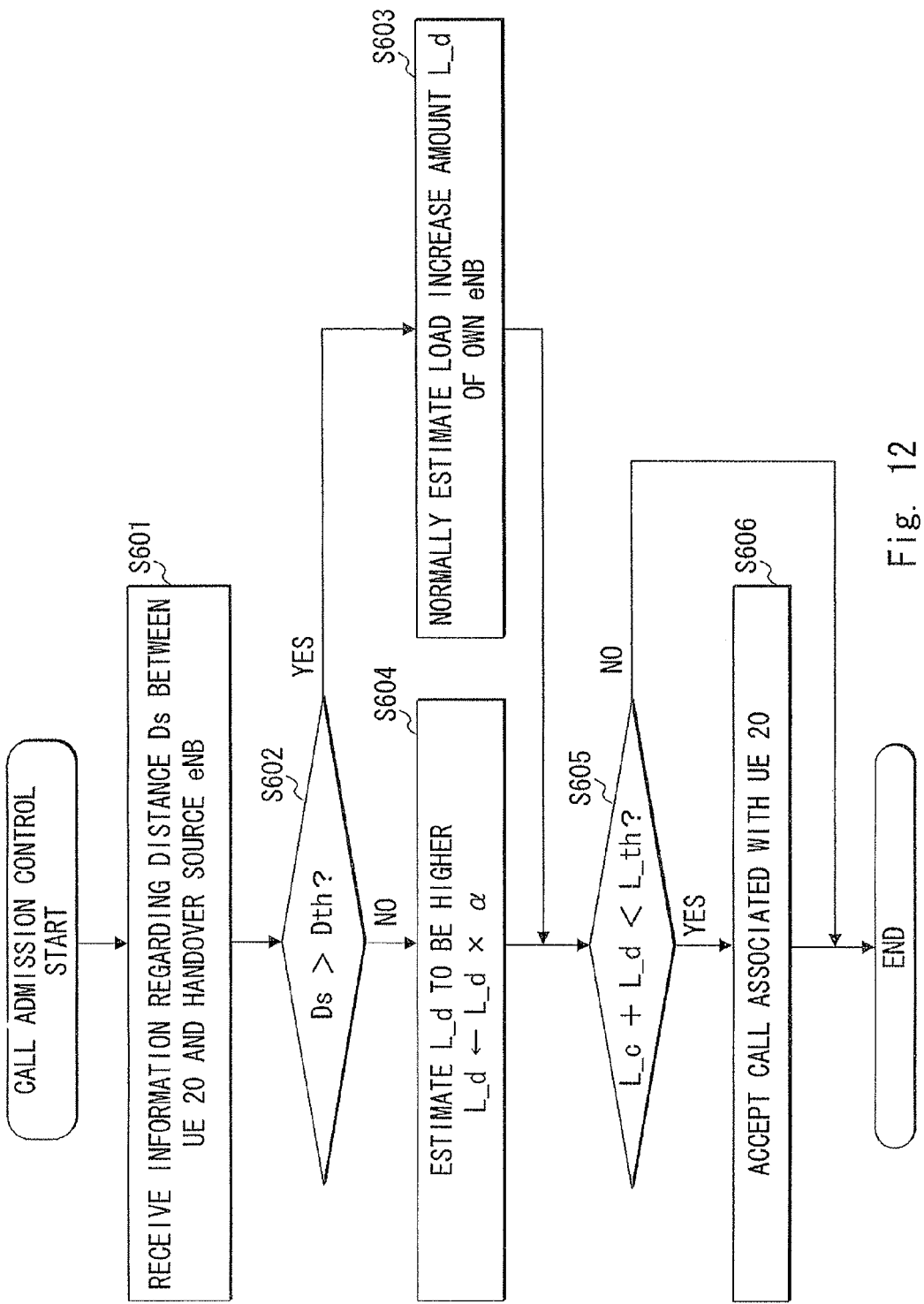
FIG. 12 is a flowchart showing an example of call admission control in a base station according to a fourth exemplary embodiment of the present invention.

A mobile communication system according to this exemplary embodiment can be formed in the similar way to FIG. 1. Further, an eNB according to this exemplary embodiment can be formed as is similar to FIG. 2. However, the eNB according to this exemplary embodiment is different from that of the first exemplary embodiment in that the controller 122 in the eNB 10 executes call admission control as shown in FIG. 12.

Specifically, the controller 122 receives information regarding a distance Ds between the UE 20 and the handover source eNB measured by the handover source eNB via the Backhaul link communication unit 11, as is different from the call admission control shown above in FIG. 4 (Step S601). The handover source eNB can easily calculate the distance Ds based on the transmission power of the UE 20, for example. Alternatively, when the UE 20 includes a GPS (Global Positioning System) receiver, the handover source eNB may calculate the distance Ds based on the positional information acquired by the GPS receiver.

The controller 122 then compares the distance Ds with a predetermined threshold Dth (Step S602). As a result, when Ds>Dth is established, the controller 122 determines that the UE 20 is the UE which should preferably be handed over even when the load distribution is not executed (i.e., it is assumed that Mn>Ms is established). The controller 122 then normally estimates the load increase amount L_d of the own eNB as is similar to the above Step S203 (Step S603).

Meanwhile, when Ds≤Dth is established at the above Step S602, the controller 122 determines that the UE 20 is the UE which is forced to be handed over according to the execution of the load distribution (i.e., it is assumed that Mn≤Ms is established). The controller 122 then estimates the load increase amount L_d to be higher as is similar to the above Step S204 (Step S604).

The controller 122 then determines whether it is possible to accept a new call according to the above equation (2), as is similar to the above Step S205 (Step S505).

When the condition shown in the above equation (2) is satisfied, the controller 122 accepts the call associated with the UE 20 as is similar to the above Step S206 (Step S506). Meanwhile, when the condition shown in the above equation (2) is not satisfied, the controller 122 does not accept the call associated with the UE 20 and ends the processing.

In this way, in this exemplary embodiment, when the load distribution is executed, the call associated with the UE where the necessity for handover is high is more likely to be accepted by the handover destination eNB. In contrast, the call associated with the UE where the necessity for handover is low is less likely to be accepted by the handover destination eNB.

Accordingly, as is similar to the first exemplary embodiment, such effects can be achieved that it is possible to reduce the occurrence of call loss in UE while suppressing degradation of communication quality in the handover destination cell.

[Fifth Exemplary Embodiment]

Figure 13:
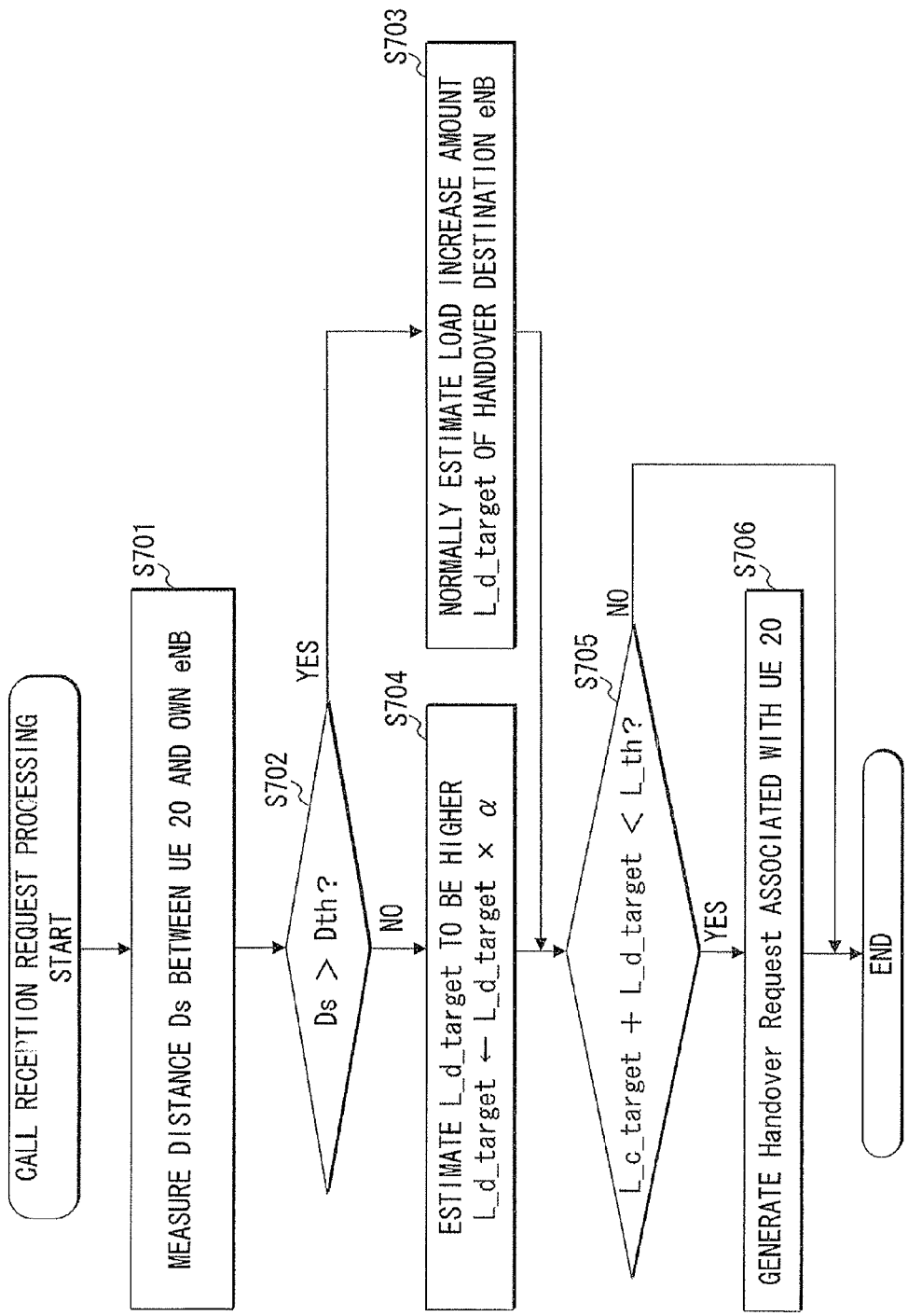
FIG. 13 is a flowchart showing an example of call admission request processing in a base station according to a fifth exemplary embodiment of the present invention.

A mobile communication system according to this exemplary embodiment can be formed in the similar way to FIG. 1. Further, an eNB according to this exemplary embodiment can be formed as is similar to FIG. 9. However, the eNB according to this embodiment is different from that in the third exemplary embodiment stated above in that the controller 142 in the eNB 10a executes call admission request processing as shown in FIG. 13.

Specifically, as is different from the call admission request processing shown above in FIG. 11, the controller 142 controls the UU link communication unit 13 to measure the distance Ds between the UE 20 and the own eNB 10a (Step S701). As shown in the fourth exemplary embodiment above, the controller 142 can calculate the distance Ds based on the transmission power of the UE 20, the positional information acquired by the GPS receiver, or the like.

The controller 142 then compares the distance Ds with the predetermined threshold Dth (Step S702). As a result, when Ds>Dth is established, the controller 142 normally estimates the load increase amount L_d_target when the handover destination eNB accepts the call associated with the UE 20, as is similar to the above Step S504 (Step S703).

Meanwhile, when Ds≤Dth is established in the above Step S602, as is similar to the above Step S505, the controller 142 estimates the load increase amount L_d_target to be higher (Step S704).

The controller 142 then determines whether the handover destination eNB can accept a new call according to the equation (3) shown above, as is similar to the above Step S506 (Step S705).

When the condition shown in the above equation (3) is satisfied, the controller 142 generates Handover Request (or Handover Required) associated with the UE 20 as is similar to the above Step S507 (Step S706). Meanwhile, when the condition as shown in the above equation (3) is not satisfied, the controller 142 determines that the handover destination eNB cannot accept the call associated with the UE 20. Then, the controller 142 does not generate Handover Request (or Handover Required) and ends the processing.

In this way, in this exemplary embodiment, when the load distribution is executed, the admission of the call associated with the UE where the necessity for handover is high is more likely to be requested to the handover destination eNB. In contrast, the admission of the call associated with the UE where the necessity for handover is low is less likely to be requested to the handover destination eNB.

Accordingly, as is similar to the first exemplary embodiment, such effects can be achieved that it is possible to reduce the occurrence of call loss in UE while suppressing degradation of communication quality in the handover destination cell.

In addition, since the handover source eNB determines whether it is possible to accept a call, as is similar to the third exemplary embodiment stated above, there is an advantage that time required for the call admission control is shorter than that in the first exemplary embodiment.

It would be apparent that the present invention is not limited by the exemplary embodiments stated above, but may be variously changed by a person skilled in the art based on recitation in claims.

For example, it is possible to provide a program to cause a computer to execute the processing of each of the eNBs 10 and 10a shown in the exemplary embodiments stated above. In this case, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

This application claims the benefit of priority, and incorporates herein by reference in its entirety, the following Japanese Patent Application No. 2010-125867 filed on Jun. 1, 2010.

Industrial Applicability

The present invention is applied to a base station, a mobile communication system, and a call admission control method and a call admission control program of a base station, and more specifically, to an application for performing call admission when handover is performed between radio base stations by a mobile station.

A part or all of the aforementioned exemplary embodiments may be stated as shown in the following Supplementary Notes. However, it is not limited to the following description.

(Supplementary Note 1)

A base station comprising:

a communication means for performing communication with another base station located adjacent to an own station; and a control means for performing call control associated with radio communication with a mobile station, wherein the communication means receives, from the another base station, a first reception quality in a cell formed by the own station and a second reception quality in a cell formed by the another base station, the first reception quality and the second reception quality being measured by one or more mobile stations that are in communication with the another base station, and the control means accepts a call associated with a mobile station which satisfies a first condition that the first reception quality is higher than the second reception quality in preference to a call associated with a mobile station which does not satisfy the first condition.

(Supplementary Note 2)

The base station according to Supplementary Note 1, wherein the control means accepts a call associated with a mobile station which satisfies the first condition and a second condition that a difference between the first reception quality and the second reception quality is equal to or larger than a first threshold in preference to a call associated with a mobile station which does not satisfy the first condition or the second condition.

(Supplementary Note 3)

The base station according to Supplementary Note 2, wherein the control means estimates a first load amount to be higher than a second load amount, the first load amount being increased when the call associated with the mobile station which does not satisfy the first condition or the second condition is accepted, the second load amount being increased when the call associated with the mobile station which satisfies the first condition and the second condition is accepted, and the control means determines whether a sum of a current load amount in the own station and the first load amount or the second load amount exceeds a second threshold each time the first reception quality and the second reception quality are received, and accepts each call when the sum does not exceed the second threshold.

(Supplementary Note 4)

The base station according to Supplementary Note 1, wherein the control means estimates a first load amount to be higher than a second load amount, the first load amount being increased when the call associated with the mobile station which does not satisfy the first condition is accepted, the second load amount being increased when the call associated with the mobile station which satisfies the first condition is accepted, and the control means determines whether a sum of a current load amount in the own station and the first load amount or the second load amount exceeds a threshold each time the first reception quality and the second reception quality are received, and accepts each call when the sum does not exceed the threshold.

(Supplementary Note 5)

The base station according to Supplementary Note 3 or 4, wherein the control means determines the second load amount according to a bit rate required by each of the mobile stations.

(Supplementary Note 6)

The base station according to Supplementary Note 1, wherein the control means estimates a load amount that is increased when each call is accepted using an algorithm common to each of the mobile stations, when the first reception quality and the second reception quality from the mobile station which does not satisfy the first condition are received, the control means accepts the call associated with the mobile station which does not satisfy the first condition if a sum of the load amount and a current load amount in the own station does not exceed a first threshold, and when the first reception quality and the second reception quality from the mobile station which satisfies the first condition are received, the control means accepts the call associated with the mobile station which satisfies the first condition if the sum does not exceed a second threshold set to be higher than the first threshold.

(Supplementary Note 7)

The base station according to Supplementary Note 2, wherein the control means estimates a load amount that is increased when each call is accepted using an algorithm common to each of the mobile stations, when the first reception quality and the second reception quality from the mobile station which does not satisfy the first condition or the second condition are received, the control means accepts the call associated with the mobile station which does not satisfy the first condition or the second condition if a sum of the load amount and a current load amount in the own station does not exceed a first threshold, and when the first reception quality and the second reception quality from the mobile station which satisfies the first condition and the second condition are received, the control means accepts the call associated with the mobile station which satisfies the first condition and the second condition if the sum does not exceed a second threshold set to be higher than the first threshold.

(Supplementary Note 8)

The base station according to Supplementary Note 6 or 7, wherein the control means determines the load amount according to a bit rate required by each of the mobile stations.

(Supplementary Note 9)

A base station comprising:

a communication means for performing radio communication with a mobile station; and a request means for requesting another base station located adjacent to an own station to accept a call associated with the mobile station, wherein the communication means receives a first reception quality in a cell formed by the another base station and a second reception quality in a cell formed by the own station, the first reception quality and the second reception quality being measured by one or more mobile stations that are performing radio communication, and the request means requests the another base station to accept a call associated with a mobile station which satisfies a first condition that the first reception quality is higher than the second reception quality in preference to acceptance of a call associated with a mobile station which does not satisfy the first condition.

(Supplementary Note 10)

The base station according to Supplementary Note 9, wherein the request means requests the another base station to accept a call associated with a mobile station which satisfies the first condition and a second condition that a difference between the first reception quality and the second reception quality is equal to or larger than a first threshold in preference to acceptance of a call associated with a mobile station which does not satisfy the first condition or the second condition.

(Supplementary Note 11)

The base station according to Supplementary Note 10, wherein the request means regularly receives a current load amount in the another base station from the another base station, the request means estimates a first load amount to be higher than a second load amount, the first load amount being increased when the call associated with the mobile station which does not satisfy the first condition or the second condition is accepted, the second load amount being increased when the call regarding the mobile station which satisfies the first condition and the second condition is accepted, and the request means determines whether a sum of the current load amount and the first load amount or the second load amount exceeds a second threshold each time the first reception quality and the second reception quality are received, and requests the another base station to accept each call when the sum does not exceed the second threshold.

(Supplementary Note 12)

The base station according to Supplementary Note 9, wherein the request means regularly receives a current load amount in the another base station from the another base station, the request means estimates a first load amount to be higher than a second load amount, the first load amount being increased when the call associated with the mobile station which does not satisfy the first condition is accepted, the second load amount being increased when the call associated with the mobile station which satisfies the first condition is accepted, and the request means determines whether a sum of the current load amount and the first load amount or the second load amount exceeds a threshold each time the first reception quality and the second reception quality are received, and requests the another base station to accept each call when the sum does not exceed the threshold.

(Supplementary Note 13)

The base station according to Supplementary Note 11 or 12, wherein the request means determines the second load amount according to a bit rate required by each of the mobile stations.

(Supplementary Note 14)

A base station comprising:

a communication means for performing communication with another base station located adjacent to an own station; and a control means for performing call control associated with radio communication with a mobile station, wherein the communication means receives information regarding a distance between the another base station and one or more mobile stations that are in radio communication with the another base station, the distance being measured by the another base station, and the control means accepts a call associated with a mobile station which satisfies a condition that the distance exceeds a threshold in preference to a call associated with a mobile station which does not satisfy the condition.

(Supplementary Note 15)

The base station according to Supplementary Note 14, wherein the control means estimates a first load amount to be higher than a second load amount, the first load amount being increased when the call associated with the mobile station which does not satisfy the condition is accepted, the second load amount being increased when the call associated with the mobile station which satisfies the condition is accepted, and the control means determines whether a sum of a current load amount in the own station and the first load amount or the second load amount exceeds a threshold each time the information is received, and accepts each call when the sum does not exceed the threshold.

(Supplementary Note 16)

The base station according to Supplementary Note 15, wherein the control means determines the second load amount according to a bit rate required by each of the mobile stations.

(Supplementary Note 17)

A base station comprising:

a communication means for performing radio communication with a mobile station; and a request means for requesting another base station located adjacent to an own station to accept a call associated with the mobile station, wherein the communication means measures a distance between the own station and one or more mobile stations that are in radio communication with the own station, and the request means requests the another base station to accept a call associated with a mobile station which satisfies a condition that the distance exceeds a threshold in preference to acceptance of a call associated with a mobile station which does not satisfy the condition.

(Supplementary Note 18)

The base station according to Supplementary Note 17, wherein the request means regularly receives, from the another base station, a current load amount in the another base station, the request means estimates a first load amount to be higher than a second load amount, the first load amount being increased when the call associated with the mobile station which does not satisfy the condition is accepted, the second load amount being increased when the call associated with the mobile station which satisfies the condition is accepted, and the request means determines whether a sum of the current load amount and the first load amount or the second load amount exceeds a threshold each time the distance is measured, and requests the another base station to accept each call when the sum does not exceed the threshold.

(Supplementary Note 19)

The base station according to Supplementary Note 18, wherein the request means determines the second load amount according to a bit rate required by each of the mobile stations.

(Supplementary Note 20)

A mobile communication system comprising:

a first base station; and a second base station located adjacent to the first base station, wherein the first base station notifies the second base station of a first reception quality in a cell formed by the second base station and a second reception quality in a cell formed by the first base station, the first reception quality and the second reception quality being measured by one or more mobile stations that are in radio communication with the first base station, and the second base station accepts a call associated with a mobile station which satisfies a condition that the first reception quality is higher than the second reception quality in preference to a call associated with a mobile station which does not satisfy the condition.

(Supplementary Note 21)

A mobile communication system comprising:

a first base station; and a second base station located adjacent to the first base station, wherein the first base station receives a first reception quality in a cell formed by the second base station and a second reception quality in a cell formed by the first base station, the first reception quality and the second reception quality being measured by one or more mobile stations that are in radio communication with the first base station, and the first base station requests the second base station to accept a call associated with a mobile station which satisfies a condition that the first reception quality is higher than the second reception quality in preference to acceptance of a call associated with a mobile station which does not satisfy the condition.

(Supplementary Note 22)

A mobile communication system comprising:

a first base station; and a second base station located adjacent to the first base station, wherein the first base station measures a distance between the first base station and one or more mobile stations that are in radio communication with the first base station, and notifies the second base station of information regarding the distance, and the second base station accepts a call associated with a mobile station which satisfies a condition that the distance exceeds a threshold in preference to a call associated with a mobile station which does not satisfy the condition.

(Supplementary Note 23)

A mobile communication system comprising:

a first base station; and a second base station located adjacent to the first base station, wherein the first base station measures a distance between the first base station and one or more mobile stations that are in radio communication with the first base station, and requesting the second base station to accept a call associated with a mobile station which satisfies a condition that the distance exceeds a threshold in preference to acceptance of a call associated with a mobile station which does not satisfy the condition.

(Supplementary Note 24)

A call admission control method in a base station comprising:

receiving, from another base station located adjacent to the base station, a first reception quality in a cell formed by the base station and a second reception quality in a cell formed by the another base station, the first reception quality and the second reception quality being measured by one or more mobile stations that are in radio communication with the another base station; and accepting a call associated with a mobile station which satisfies a condition that the first reception quality is higher than the second reception quality in preference to a call associated with a mobile station which does not satisfy the condition.

(Supplementary Note 25)
A call admission control method in a base station comprising:
receiving a first reception quality in a cell formed by another base station located adjacent to the base station and a second reception quality in a cell formed by the base station, the first reception quality and the second reception quality being measured by one or more mobile stations that are in radio communication with the base station; and
requesting the another base station to accept a call associated with a mobile station which satisfies a condition that the first reception quality is higher than the second reception quality in preference to acceptance of a call associated with a mobile station which does not satisfy the condition.

(Supplementary Note 26)
A call admission control method in a base station comprising:
receiving, from another base station located adjacent to the base station, information regarding a distance between the another base station and one or more mobile stations that are in radio communication with the another base station; and
accepting a call associated with a mobile station which satisfies a condition that the distance exceeds a threshold in preference to a call associated with a mobile station which does not satisfy the condition.

(Supplementary Note 27)
A call admission control method in a base station comprising:
measuring a distance between the base station and one or more mobile stations that are in radio communication with the base station; and
requesting another base station located adjacent to the base station to accept a call associated with a mobile station which satisfies a condition that the distance exceeds a threshold in preference to acceptance of a call associated with a mobile station which does not satisfy the condition.

(Supplementary Note 28)
A call admission control program for causing a base station to execute the following processing of:
receiving, from another base station located adjacent to the base station, a first reception quality in a cell formed by the base station and a second reception quality in a cell formed by the another base station, the first reception quality and the second reception quality being measured by one or more mobile stations that are in radio communication with the another base station; and
accepting a call associated with a mobile station which satisfies a condition that the first reception quality is higher than the second reception quality in preference to a call associated with a mobile station which does not satisfy the condition.

(Supplementary Note 29)
A call admission control program for causing a base station to execute the following processing of:
receiving a first reception quality in a cell formed by another base station located adjacent to the base station and a second reception quality in a cell formed by the base station, the first reception quality and the second reception quality being measured by one or more mobile stations that are in radio communication with the base station; and
requesting the another base station to accept a call associated with a mobile station which satisfies a condition that the first reception quality is higher than the second reception quality in preference to acceptance of a call associated with a mobile station which does not satisfy the condition.

(Supplementary Note 30)
A call admission control program for causing a base station to execute the following processing of:
receiving, from another base station located adjacent to the base station, information regarding a distance between the another base station and one or more mobile stations that are in radio communication with the another base station; and
accepting a call associated with a mobile station which satisfies a condition that the distance exceeds a threshold in preference to a call associated with a mobile station which does not satisfy the condition.

(Supplementary Note 31)
A call admission control program for causing a base station to execute the following processing of:
measuring a distance between the base station and one or more mobile stations that are in radio communication with the base station; and
requesting another base station located adjacent to the base station to accept a call associated with a mobile station which satisfies a condition that the distance exceeds a threshold in preference to acceptance of a call associated with a mobile station which does not satisfy the condition.

Reference Signs List

1 MOBILE COMMUNICATION SYSTEM
10, 10_1, 10_2, 10A, 10A_1, 10A_2 eNB
11_1, 11_2 CELL
11, 141 Backhaul COMMUNICATION UNIT
12 CALL CONTROL UNIT
13, 121 UU LINK COMMUNICATION UNIT
14 CALL ADMISSION REQUEST UNIT
20 UE
30 MME
40 S-GW
122, 142 CONTROLLER
123 LOAD INCREASE AMOUNT ESTIMATION TABLE
Ds DISTANCE
L_c, L_c_target CURRENT LOAD AMOUNT
L_d, L_d_target LOAD INCREASE AMOUNT
Dth, L_th, L_th1, L_th2, Mth THRESHOLD
MN, MS RECEPTION QUALITY
α COEFFICIENT

The invention claimed is:
1. A base station, including at least one processor, comprising:
a communication unit, within at least one of said at least one processor, that performs communication with another base station located adjacent to an own station; and
a control unit, within at least one of said at least one processor, that performs call control associated with radio communication with a mobile station, wherein
the communication unit receives, from the another base station, a first reception quality in a cell formed by the own station and a second reception quality in a cell formed by the another base station, the first reception quality and the second reception quality being measured by one or more mobile stations that are in communication with the another base station,
the control unit accepts a call associated with a mobile station which satisfies a first condition that the first reception quality is higher than the second reception quality in preference to a call associated with a mobile station which does not satisfy the first condition,
the control unit accepts a call associated with a mobile station which satisfies the first condition and a second condition that a difference between the first reception quality and the second reception quality is equal to or larger than a first threshold in preference to a call associated with a mobile station which does not satisfy the first condition or the second condition, the control unit estimates a first load amount to be higher than a second load amount, wherein the first load amount is increased when the call associated with the mobile station which does not satisfy the first condition or the second condition is accepted, and wherein the second load amount is increased when the call associated with the mobile station which satisfies the first condition and the second condition is accepted, and the control unit determines whether a sum of a current load amount in the own station and the first load amount or the second load amount exceeds a second threshold each time the first reception quality and the second reception quality are received, and accepts each call when the sum does not exceed the second threshold.

2. The base station according to claim 1, wherein the control unit determines the second load amount according to a bit rate required by each of the mobile stations.

3. A base station, including at least one processor, comprising:

a communication unit, within at least one of said at least one processor, that performs communication with another base station located adjacent to an own station; and a control unit, within at least one of said at least one processor, that performs call control associated with radio communication with a mobile station, wherein the communication unit receives, from the another base station, a first reception quality in a cell formed by the own station and a second reception quality in a cell formed by the another base station, the first reception quality and the second reception quality being measured by one or more mobile stations that are in communication with the another base station, the control unit accepts a call associated with a mobile station which satisfies a first condition that the first reception quality is higher than the second reception quality in preference to a call associated with a mobile station which does not satisfy the first condition, the control unit estimates a first load amount to be higher than a second load amount, wherein the first load amount is increased when the call associated with the mobile station which does not satisfy the first condition is accepted, and wherein the second load amount is increased when the call associated with the mobile station which satisfies the first condition is accepted, and the control unit determines whether a sum of a current load amount in the own station and the first load amount or the second load amount exceeds a threshold each time the first reception quality and the second reception quality are received, and accepts each call when the sum does not exceed the threshold.

4. The base station according to claim 3, wherein the control unit determines the second load amount according to a bit rate required by each of the mobile stations.

5. A base station, including at least one processor, comprising:

a communication unit, within at least one of said at least one processor, that performs communication with another base station located adjacent to an own station; and a control unit, within at least one of said at least one processor, that performs call control associated with radio communication with a mobile station, wherein the communication unit receives, from the another base station, a first reception quality in a cell formed by the own station and a second reception quality in a cell formed by the another base station, the first reception quality and the second reception quality being measured by one or more mobile stations that are in communication with the another base station, the control unit accepts a call associated with a mobile station which satisfies a first condition that the first reception quality is higher than the second reception quality in preference to a call associated with a mobile station which does not satisfy the first condition, the control unit estimates a load amount that is increased when each call is accepted using an algorithm common to each of the mobile stations, when the first reception quality and the second reception quality from the mobile station which does not satisfy the first condition are received, the control unit accepts the call associated with the mobile station which does not satisfy the first condition if a sum of the load amount and a current load amount in the own station does not exceed a first threshold, and when the first reception quality and the second reception quality from the mobile station which satisfies the first condition are received, the control unit accepts the call associated with the mobile station which satisfies the first condition if the sum does not exceed a second threshold set to be higher than the first threshold.

6. The base station according to claim 5, wherein the control unit determines the load amount according to a bit rate required by each of the mobile stations.

7. A base station, including at least one processor, comprising:

a communication unit, within at least one of said at least one processor, that performs communication with another base station located adjacent to an own station; and a control unit, within at least one of said at least one processor, that performs call control associated with radio communication with a mobile station, wherein the communication unit receives, from the another base station, a first reception quality in a cell formed by the own station and a second reception quality in a cell formed by the another base station, the first reception quality and the second reception quality being measured by one or more mobile stations that are in communication with the another base station, the control unit accepts a call associated with a mobile station which satisfies a first condition that the first reception quality is higher than the second reception quality in preference to a call associated with a mobile station which does not satisfy the first condition, the control unit accepts a call associated with a mobile station which satisfies the first condition and a second condition that a difference between the first reception quality and the second reception quality is equal to or larger than a first threshold in preference to a call associated with a mobile station which does not satisfy the first condition or the second condition, the control unit estimates a load amount that is increased when each call is accepted using an algorithm common to each of the mobile stations, when the first reception quality and the second reception quality from the mobile station which does not satisfy the first condition or the second condition are received, the control unit accepts the call associated with the mobile station which does not satisfy the first condition or the second condition if a sum of the load amount and a current load amount in the own station does not exceed a first threshold, and when the first reception quality and the second reception quality from the mobile station which satisfies the first condition and the second condition are received, the control unit accepts the call associated with the mobile station which satisfies the first condition and the second condition if the sum does not exceed a second threshold set to be higher than the first threshold.

8. The base station according to claim 7, wherein the control unit determines the load amount according to a bit rate required by each of the mobile stations.

9. A base station, including at least one processor, comprising:

a communication unit, within at least one of said at least one processor, that performs radio communication with a mobile station; and a request unit, within at least one of said at least one processor, that requests another base station located adjacent to an own station to accept a call associated with the mobile station, wherein the communication unit receives a first reception quality in a cell formed by the another base station and a second reception quality in a cell formed by the own station, the first reception quality and the second reception quality being measured by one or more mobile stations that are performing radio communication, the request unit requests the another base station to accept a call associated with a mobile station which satisfies a first condition that the first reception quality is higher than the second reception quality in preference to acceptance of a call associated with a mobile station which does not satisfy the first condition, the request unit requests the another base station to accept a call associated with a mobile station which satisfies the first condition and a second condition that a difference between the first reception quality and the second reception quality is equal to or larger than a first threshold in preference to acceptance of a call associated with a mobile station which does not satisfy the first condition or the second condition, the request unit regularly receives a current load amount in the another base station from the another base station, the request unit estimates a first load amount to be higher than a second load amount, wherein the first load amount is increased when the call associated with the mobile station which does not satisfy the first condition or the second condition is accepted, and wherein the second load amount is increased when the call regarding the mobile station which satisfies the first condition and the second condition is accepted, and the request unit determines whether a sum of the current load amount and the first load amount or the second load amount exceeds a second threshold each time the first reception quality and the second reception quality are received, and requests the another base station to accept each call when the sum does not exceed the second threshold.

10. The base station according to claim 9, wherein the request unit determines the second load amount according to a bit rate required by each of the mobile stations.

11. A base station, including at least one processor, comprising:

a communication unit, within at least one of said at least one processor, that performs radio communication with a mobile station; and a request unit, within at least one of said at least one processor, that requests another base station located adjacent to an own station to accept a call associated with the mobile station, wherein the communication unit receives a first reception quality in a cell formed by the another base station and a second reception quality in a cell formed by the own station, the first reception quality and the second reception quality being measured by one or more mobile stations that are performing radio communication, the request unit requests the another base station to accept a call associated with a mobile station which satisfies a first condition that the first reception quality is higher than the second reception quality in preference to acceptance of a call associated with a mobile station which does not satisfy the first condition, the request unit regularly receives a current load amount in the another base station from the another base station, the request unit estimates a first load amount to be higher than a second load amount, wherein the first load amount is increased when the call associated with the mobile station which does not satisfy the first condition is accepted, and wherein the second load amount is increased when the call associated with the mobile station which satisfies the first condition is accepted, and the request unit determines whether a sum of the current load amount and the first load amount or the second load amount exceeds a threshold each time the first reception quality and the second reception quality are received, and requests the another base station to accept each call when the sum does not exceed the threshold.

12. The base station according to claim 11, wherein the request unit determines the second load amount according to a bit rate required by each of the mobile stations.

13. A base station, including at least one processor, comprising:

a communication unit, within at least one of said at least one processor, that performs communication with another base station located adjacent to an own station; and a control unit, within at least one of said at least one processor, that performs call control associated with radio communication with a mobile station, wherein the communication unit receives information regarding a distance between the another base station and one or more mobile stations that are in radio communication with the another base station, the distance being measured by the another base station, the control unit accepts a call associated with a mobile station which satisfies a condition that the distance exceeds a threshold in preference to a call associated with a mobile station which does not satisfy the condition, the control unit estimates a first load amount to be higher than a second load amount, wherein the first load amount is increased when the call associated with the mobile station which does not satisfy the condition is accepted, and wherein the second load amount is increased when the call associated with the mobile station which satisfies the condition is accepted, and the control unit determines whether a sum of a current load amount in the own station and the first load amount or the second load amount exceeds a threshold each time the information is received, and accepts each call when the sum does not exceed the threshold.

14. The base station according to claim 13, wherein the control unit determines the second load amount according to a bit rate required by each of the mobile stations.

* * * * *